US012090800B2

(12) United States Patent
Deering

(10) Patent No.: US 12,090,800 B2
(45) Date of Patent: Sep. 17, 2024

(54) AIR BARRIER MATERIAL APPLICATION SYSTEMS AND METHODS

(71) Applicant: BRIDGESTONE AMERICAS TIRE OPERATIONS, LLC, Nashville, TN (US)

(72) Inventor: Joseph D. Deering, Hendersonville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/358,114

(22) Filed: Jul. 25, 2023

(65) Prior Publication Data

US 2023/0364945 A1 Nov. 16, 2023

Related U.S. Application Data

(62) Division of application No. 18/151,536, filed on Jan. 9, 2023, now abandoned, which is a division of application No. 17/670,569, filed on Feb. 14, 2022, now Pat. No. 11,597,236, which is a division of application No. 16/481,741, filed as application No.

(Continued)

(51) Int. Cl.
*B05D 1/02* (2006.01)
*B05D 1/00* (2006.01)
*B05D 3/02* (2006.01)
*B05D 7/22* (2006.01)
*B29D 30/00* (2006.01)
(Continued)

(52) U.S. Cl.
CPC .............. *B60C 5/14* (2013.01); *B05D 1/002* (2013.01); *B05D 1/02* (2013.01); *B05D 3/0218* (2013.01); *B05D 7/22* (2013.01);

*B29D 30/0005* (2013.01); *B29D 30/0681* (2013.01); *B05D 2259/00* (2013.01); *B29D 2030/0022* (2013.01); *B29D 2030/0027* (2013.01); *B29D 2030/0682* (2013.01)

(58) Field of Classification Search
CPC . B05D 1/002; B05D 1/02; B05D 7/02; B05D 2259/00; B05B 3/02; B05B 13/0221; B05B 13/0271; B05B 13/06; B05B 13/069; B05B 13/0645; B05B 13/0654; B05B 13/0681; B05B 15/628; B05B 15/68; B05B 15/80; B65G 2201/0273
USPC .... 427/230, 231, 233, 236, 421.1, 424, 425, 427/427.1, 427.2, 427.3, 427.4, 427.6, 427/427.7, FOR. 109; 152/450, 510, 152/DIG. 16
See application file for complete search history.

(56) References Cited

U.S. PATENT DOCUMENTS 1,465,229 A * 8/1923 Moore .................... B24B 5/366
451/397
4,289,089 A * 9/1981 Tacke ........................ B05B 7/32
118/500

(Continued)

FOREIGN PATENT DOCUMENTS

GB       1598797 A  *  9/1981  ......... B29D 30/0685
SU    1622153 A1  *  1/1991

*Primary Examiner* — William P Fletcher, III

(57) ABSTRACT

A method of applying an air barrier to an inner surface of a tire includes placing the tire in a tire trimming machine, rotating the tire in the tire trimming machine as a part of a tire trimming operation, and while performing the tire trimming operation spraying the air barrier material onto the inner surface of the tire.

12 Claims, 24 Drawing Sheets

Related U.S. Application Data

PCT/US2018/015712 on Jan. 29, 2018, now Pat. No. 11,279,175.

(60) Provisional application No. 62/452,179, filed on Jan. 30, 2017.

(51) Int. Cl.
*B29D 30/06* (2006.01)
*B60C 5/14* (2006.01)

(56) References Cited

U.S. PATENT DOCUMENTS

| | | | |
|---|---|---|---|
| 7,122,220 B1 * | 10/2006 | Hawkins | B29D 30/0662 |
| | | | 427/236 |
| 10,016,952 B2 * | 7/2018 | Grunlan | B29D 30/0685 |
| 11,465,376 B2 * | 10/2022 | Randall | B29D 30/0681 |
| 2006/0288931 A1 * | 12/2006 | Hawkins | B29D 30/0662 |
| | | | 118/317 |
| 2011/0129557 A1 * | 6/2011 | Rose | B29C 33/04 |
| | | | 425/58.1 |
| 2020/0391456 A1 * | 12/2020 | Pontone | B29D 30/0685 |

* cited by examiner

AIR BARRIER MATERIAL APPLICATION SYSTEMS AND METHODS

CROSS-REFERENCE TO RELATED APPLICATIONS

The present application is a divisional of U.S. patent appl. Ser. No. 18/151,536, filed Jan. 9, 2023, now abandoned, which was a divisional of U.S. patent appl. Ser. No. 17/670,569, filed Feb. 14, 2022, now U.S. Pat. No. 11,597,236, which was a divisional of U.S. pat. appl. Ser. No. 16/481,741, filed Jul. 29, 2019, now U.S. Pat. No. 11,279,175, which was a 35 USC Sec. 371 national stage entry of PCT/US2018/015712, filed Jan. 29, 2018, which claimed benefit to U.S. Provisional Patent Appl. Ser. No. 62/452,179, filed Jan. 30, 2017.

BACKGROUND

The present disclosure relates generally to methods and apparatuses for building a tire. More particularly, the present disclosure pertains to building a tire without a typical inner liner and instead spraying on an air barrier material on the inner surface of the tire.

Typical pneumatic tires having inner liners are known in the art. An inner liner is used because the rubber used for the other portions of the tire is too permeable and allows air inside the tire to escape over time. The inner liner is made from a different and more expensive rubber that allows much less air to escape the tire over time. Halogenated rubbers, which are used in inner liners are, on a pound per pound basis, the most expensive rubber in a tire. One to two pounds of inner liner rubber is used in a typical passenger tire. Concerns over expense, ease of manufacture, and ultimate finished tire weight make the typical inner liner undesirable.

What is needed, therefore, is one or more methods and apparatuses that allow for an inner liner to be sprayed onto the inner surface of the tire.

BRIEF SUMMARY

Briefly, the present disclosure relates, in one embodiment, to a method of applying an air barrier material to an inner surface of a tire. The method may include curing the tire; securing the tire onto a chuck of a post-cure inflation machine; performing a first post-cure inflation cycle; spraying the air barrier material onto the inner surface of the tire while the tire is in a spray position within 25 degrees of vertical; and axially rotating the tire while the tire is secured on the chuck in the spray position.

The present disclosure also relates, in one embodiment, to a method of applying an air barrier material to an inner surface of a tire. The method may include performing a post-cure inflation of the tire; placing the tire onto a dump gate platform after finishing the post-cure inflation of the tire; and spraying the air barrier material onto the inner surface of the tire while the tire is on the dump gate platform.

The present disclosure further relates, in an embodiment, to a method of applying an air barrier material to an inner surface of a tire. The method may include conveying the tire to a spray area section of a conveyor system; stopping the tire on the spray area section; spraying the air barrier material onto the inner surface of the tire while the tire is stopped on the spray area section; and conveying the tire away from the spray area section after spraying the air barrier material onto the inner surface of the tire.

The present disclosure further still relates, in one embodiment, to a method of applying an air barrier material to an inner surface of a tire. The method may include placing the tire in a tire trimming machine; rotating the tire in the tire trimming machine as part of a tire trimming operation; and spraying the air barrier material onto the inner surface of the tire while performing the tire trimming operation.

The present disclosure even further relates, in one embodiment, to a sprayer apparatus for spraying an air barrier material onto an inner surface of a tire. The sprayer apparatus may include a nozzle. The nozzle may include at least one material opening defined in the nozzle. The at least one material opening may be configured to project the air barrier material in a general material direction. At least one first air projection opening may be defined in the nozzle on a first side of the at least one material opening. At least one second air projection opening may be defined in the nozzle on a second side of the at least one material opening. The second side may be opposite the first side. The at least one first air projection opening and the at least one second air projection opening may each be configured to project a respective one of two air blades to contain the material between the air blades.

The present disclosure also relates, in one embodiment, to a post-cure inflation machine for processing a tire. The post-cure inflation machine may include a tire holder shaft. The tire holder shaft may include a chuck configured to secure the tire to the tire holder shaft. A hollow passage may be defined in the tire holder shaft. A spray nozzle may be connected to a spray shaft. The spray shaft may be telescopically disposed in the hollow passage of the tire holder shaft so that the spray nozzle may extend to spray an air barrier material onto the tire.

The present disclosure further still relates, in one embodiment, to a spray area section of a conveyor system for processing a tire. The spray area section may include a spray area platform. A sprayer passage may be defined in the spray area platform. A spray nozzle may be configured to pass through the sprayer passage so that the spray nozzle may extend to spray an air barrier material onto the tire.

The present disclosure yet further relates, in one embodiment, to a tire trimming machine for processing a tire. The tire trimming machine may include at least one centering roller configured to bias the tire into a centered position. At least one blade may be configured to trim the tire. A spray nozzle may be configured to extend to spray an air barrier material onto the tire.

DETAILED DESCRIPTION

Figure 1:
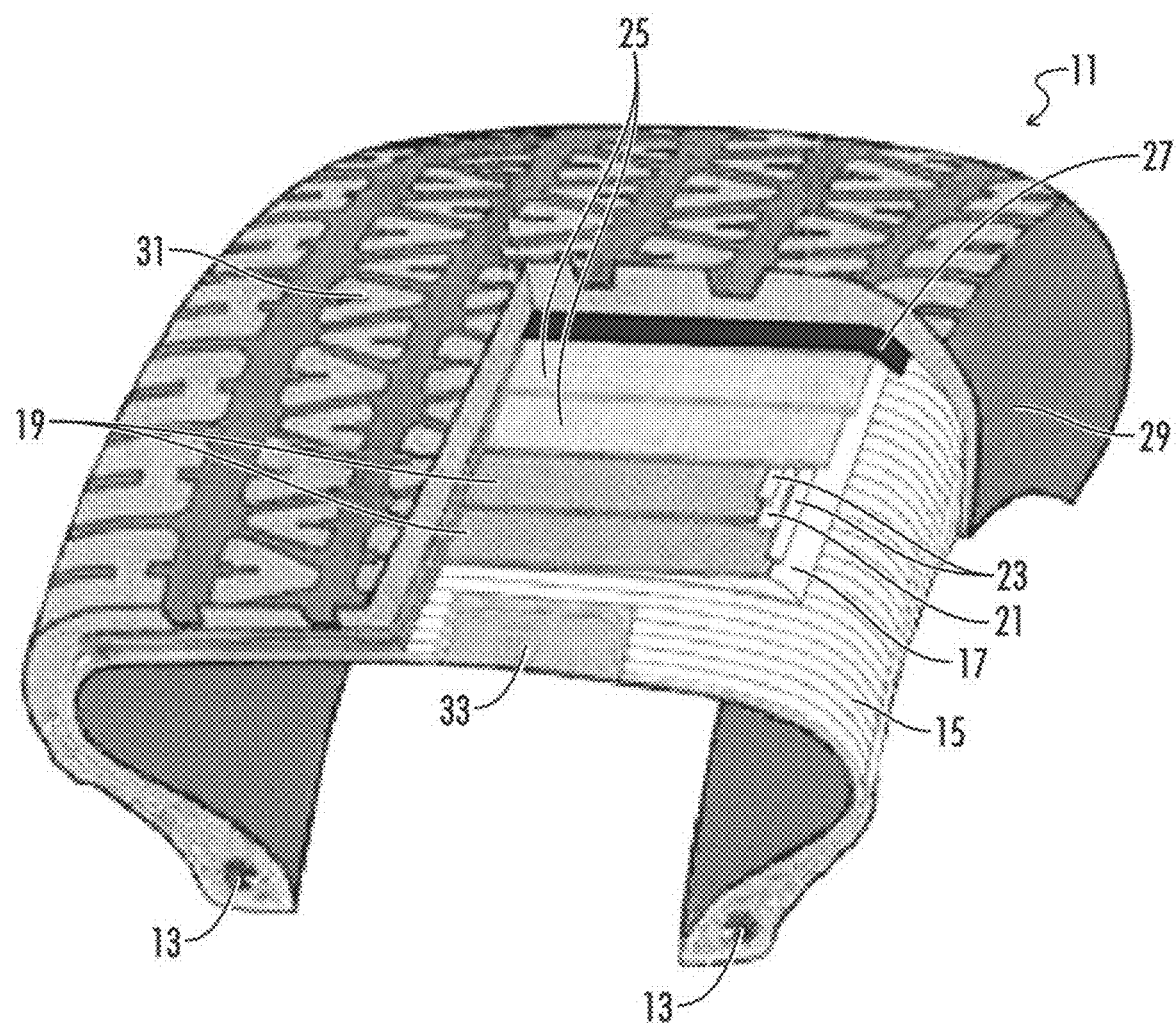
FIG. 1 is a cross-sectional view of a typical pneumatic passenger tire.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

The words "vertical" and "horizontal" are used for clarity of language to aid in understanding the disclosure. These words are in reference to orientations of the components when being viewed in an upright position and do not limit any of the claims to only the upright position. Vertical may, in some embodiments, be associated with an axis along the direction of gravity. Horizontal, then, may be associated with an axis that is perpendicular thereto. The terms substantially vertical and substantially horizontal may refer to a range that is about true vertical and true horizontal. Substantially vertical should be understood to be any orientation with an absolute angle up to 25 degrees, and more preferably up to 15 degrees, from an axis along the direction of gravity. Substantially horizontal should be understood to be any orientation with an absolute angle of up to 25 degrees, and more preferably up to 15 degrees, from an axis perpendicular to the direction of gravity.

Unless specifically stated otherwise, any part of the apparatus of the present disclosure may be made of any appropriate or suitable material including, but not limited to, metal, alloy, polymer, polymer mixture, wood, composite, or any combination thereof.

Referring to FIG. 1, a typical pneumatic passenger tire 11 is shown. The tire 11 may be multi-layered and may include tire beads 13, body plies 15, at least one cushion 17, steel belts 19, at least one belt wedge 21, gum strips 23, nylon overlays 25, undertread 27, sidewalls 29, and a tread portion 31. The typical pneumatic passenger tire 11 also includes an inner liner 33, often a halobutyl, chlorobutyl, or bromobutyl liner. This inner liner 33 is used because the rubber used for the other portions of the tire 11 is too permeable and allows air inside the tire to escape over time. The inner liner 33 is made from a different and more expensive rubber that allows much less air to escape the tire over time. Halogenated rubbers, which are used in inner liners 33, are, on a pound per pound basis, the most expensive rubber in a tire 11. One to two pounds of inner liner rubber is used in a typical passenger tire 11.

Figure 2:
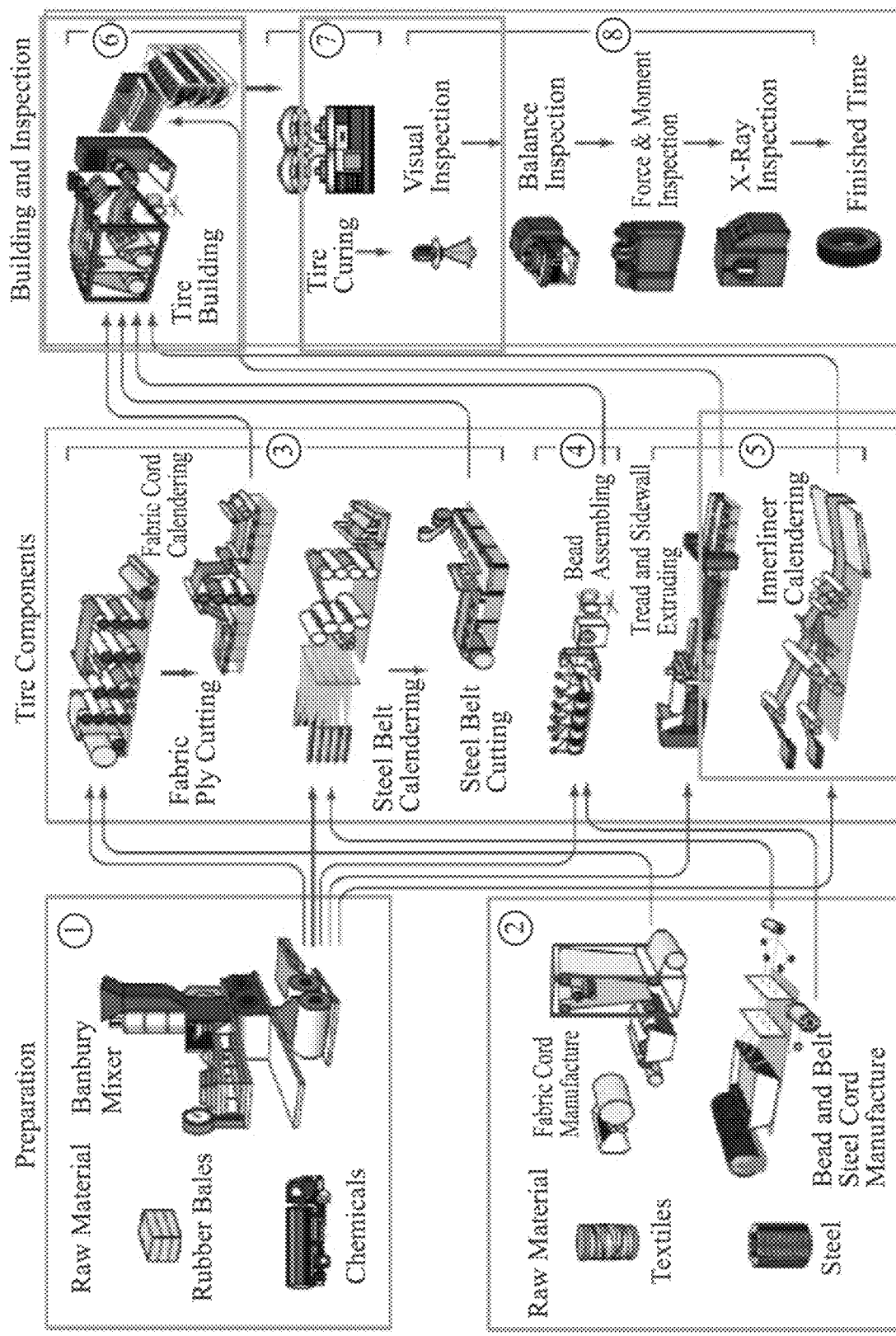
FIG. 2 is a flow chart showing the typical steps of creating a pneumatic tire.
Figure 3:
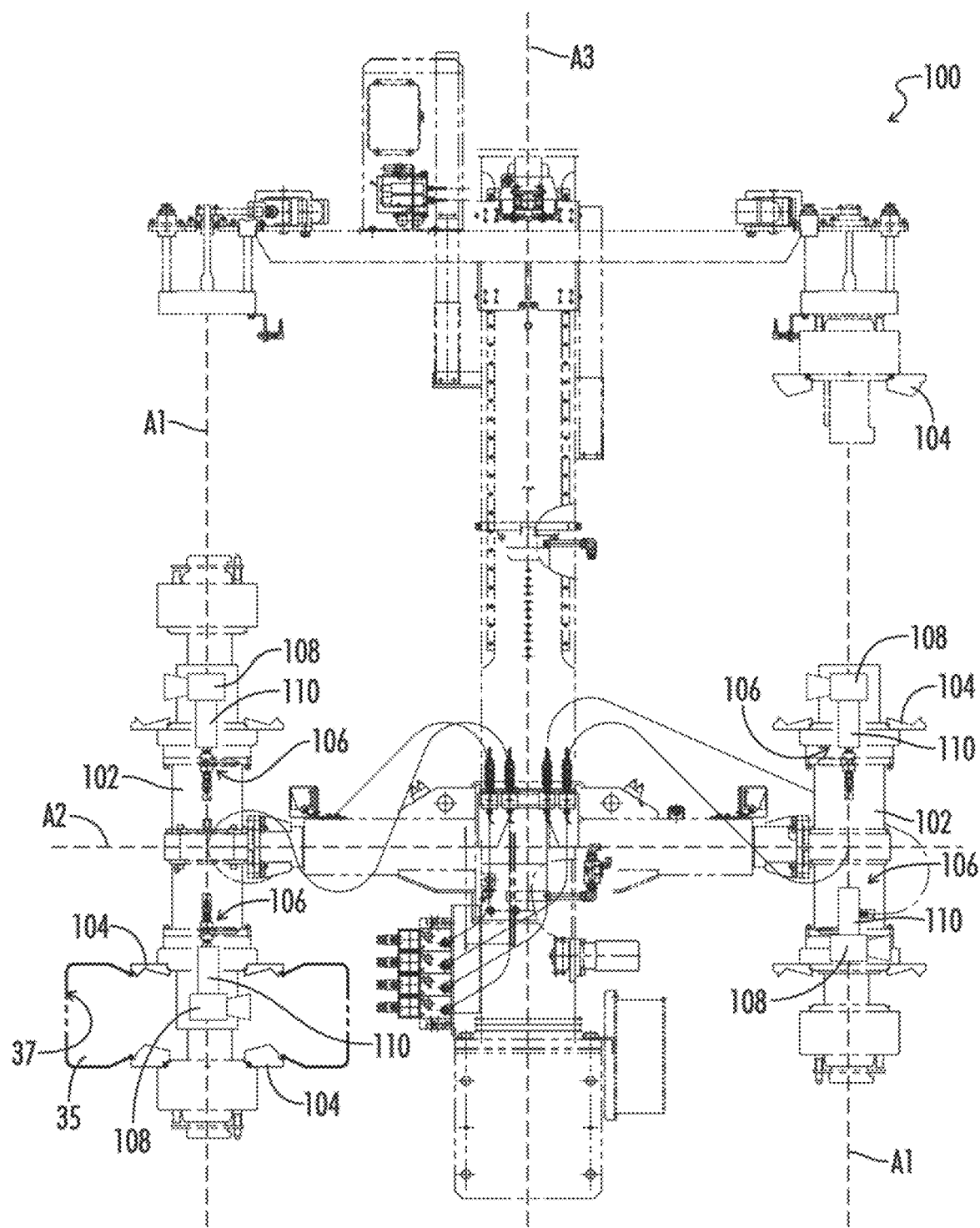
FIG. 3 is a front elevation view of an embodiment of a post-cure inflation machine for processing pneumatic tires.

As shown in FIG. 2, a typical pneumatic passenger tire 11 is created according to the schematic tire build process. At steps 1 and 2, the raw materials are prepared for the building process. At step 3, the fabric cord is calendered and cut into plies, and the steel belt is calendered and cut. At step 4, the bead is assembled. At step 5, the tread and sidewall is extruded, and the inner liner is calendered. At step 6, the tire is built. At step 7, the tire is cured. At step 8, the tire is inspected in multiple fashions. Finally, the tire is finished and ready for use or sale.

Post-Cure Inflation Machine and Method Relating Thereto

Turning now to FIGS. 3-6, a post-cure inflation machine 100 is shown. The post-cure inflation machine 100 may receive a tire 35 (with no inner liner) that has recently been cured in a curing press (not shown).

At least one tire holder shaft 102 of the post-cure inflation machine 100 may include a chuck 104. The chuck 104 may be configured to secure the tire 35 to the tire holder shaft 102. At least one of the tire holder shaft 102 and the chuck 104 may be configured to rotate about an axis A1 of the tire holder shaft in some embodiments.

A hollow passage 106 may be defined in the tire holder shaft 102. A spray nozzle 108 may be connected to a spray shaft 110. The spray shaft 110 may be telescopically disposed in the hollow passage 106 of the tire holder shaft 102. This configuration may allow the spray nozzle to extend to spray an air barrier material 112 onto the tire 35.

In some embodiments, the spray nozzle 108 and spray shaft 110 may be rigidly connected to a portion of the tire holder shaft 102. The tire holder shaft 102 may be telescopic itself in many embodiments. The spray shaft 110 may also be configured to extend telescopically along the axis A1 of the tire holder shaft 102. Additionally or alternatively, the spray shaft 110 may be configured to extend telescopically in a direction perpendicular to the axis A1 of the tire holder shaft 102.

A method of applying the air barrier material 112 to an inner surface 37 of the tire 35 may be performed with the above described post-cure inflation machine 100. The method may include curing the tire 35, often with a curing press.

After the tire 35 has been cured, the tire may be secured onto the chuck 104 of the post-cure inflation machine 100. The tire 35 may be placed on the tire holder shaft 102 by a robotic arm or a person. The tire 35 may be placed on the tire holder shaft 102 at the middle-right of FIG. 3, for instance. Once the tire 35 has been received on the tire holder shaft 102, the chuck 104 may be actuated to secure the tire.

Figure 4:
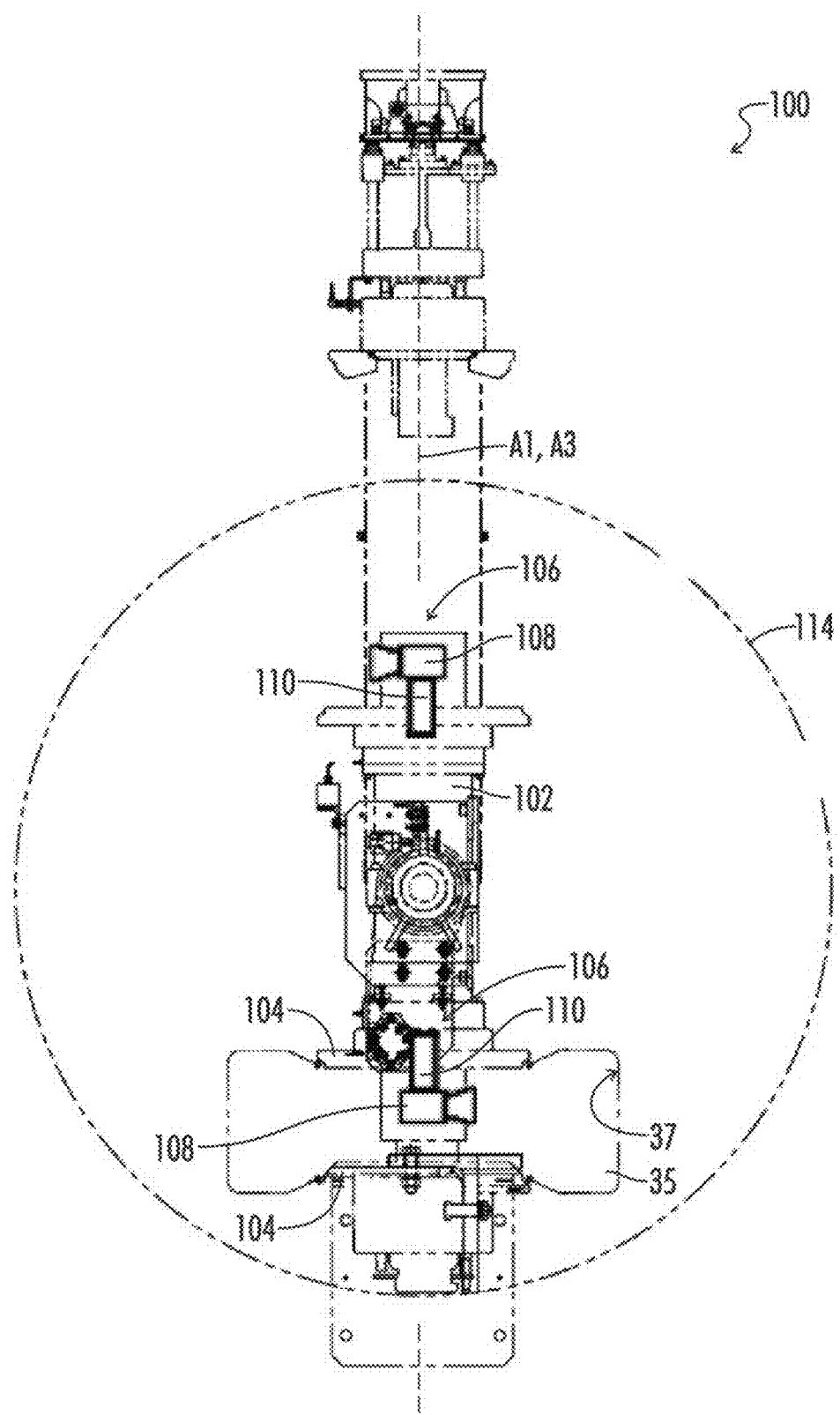
FIG. 4 is a side elevation view of the post-cure inflation machine of FIG. 3 with a first tire undergoing a first post-cure inflation cycle and a second tire not yet mounted to the post-cure inflation machine.
Figure 5:
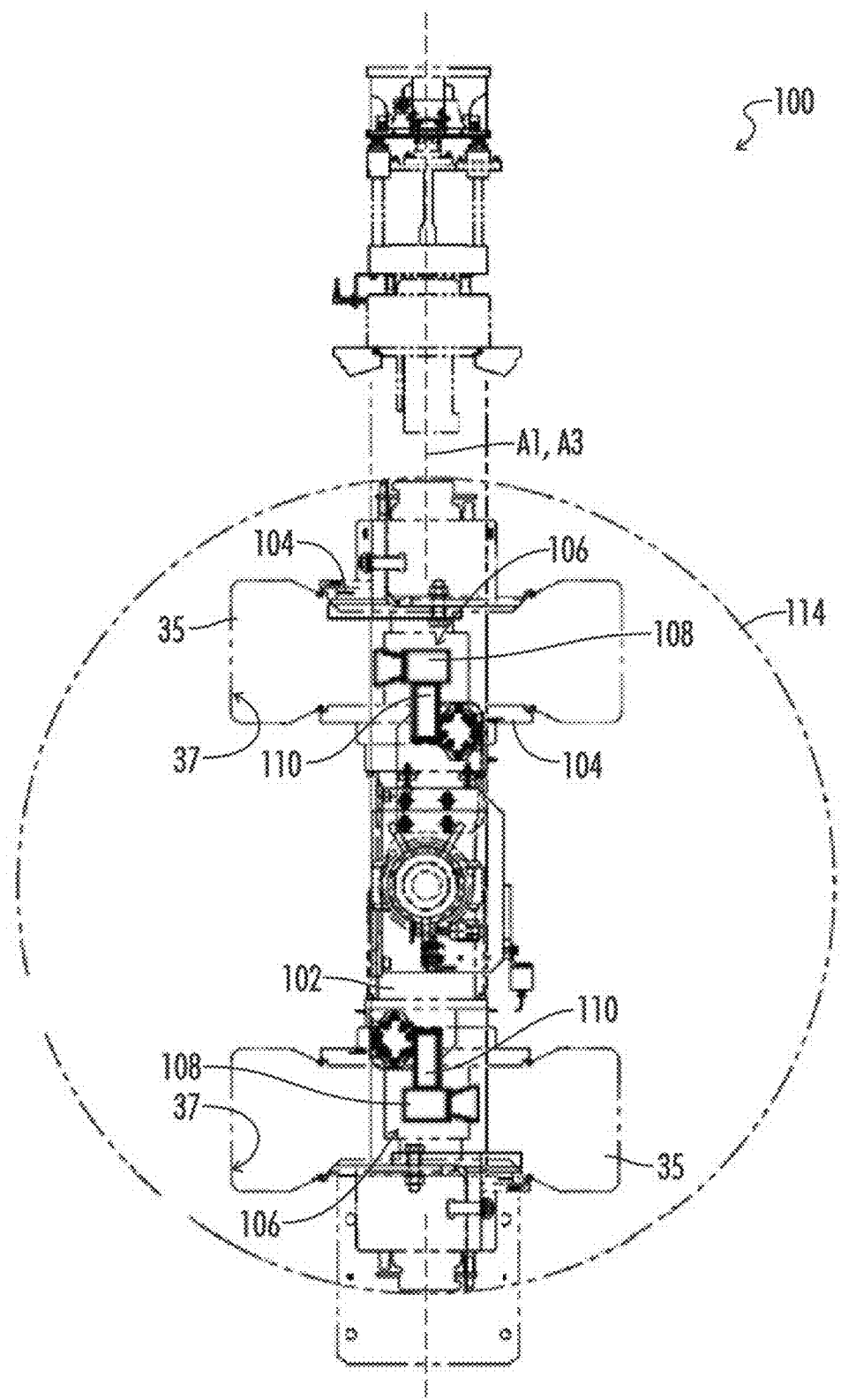
FIG. 5 is a side elevation view of the post-cure inflation machine of FIG. 3. This figure could show the first tire undergoing a second post-cure inflation cycle and the second tire undergoing a first post-cure inflation cycle. Alternatively, this figure could show the first tire undergoing a first post-cure inflation cycle and the second tire having been just recently mounted to the post-cure inflation machine.

Once the tire 35 is secured by the chuck 104, the tire holder shaft 102 may rotate around an extender arm axis A2 to position the tire holder shaft to receive another tire on the other end of the tire holder shaft. Additionally or alternatively, the tire holder shaft 102 may rotate around a base axis A3. The ends of the tire holder shaft 102 may rotate about the extender arm axis A2 along a path 114 as shown in FIGS. 4-6.

Once the tire holder shaft 102 has rotated once to place the tire 35 in a first position that is substantially horizontal, the tire begins its first post-cure inflation cycle. The bottom tire 35 on FIG. 4 is in the first position, for instance. While the bottom tire 35 is undergoing its first post-cure inflation cycle, another tire may be placed on the top part of the tire holder shaft 102 as shown in FIG. 5.

Figure 6:
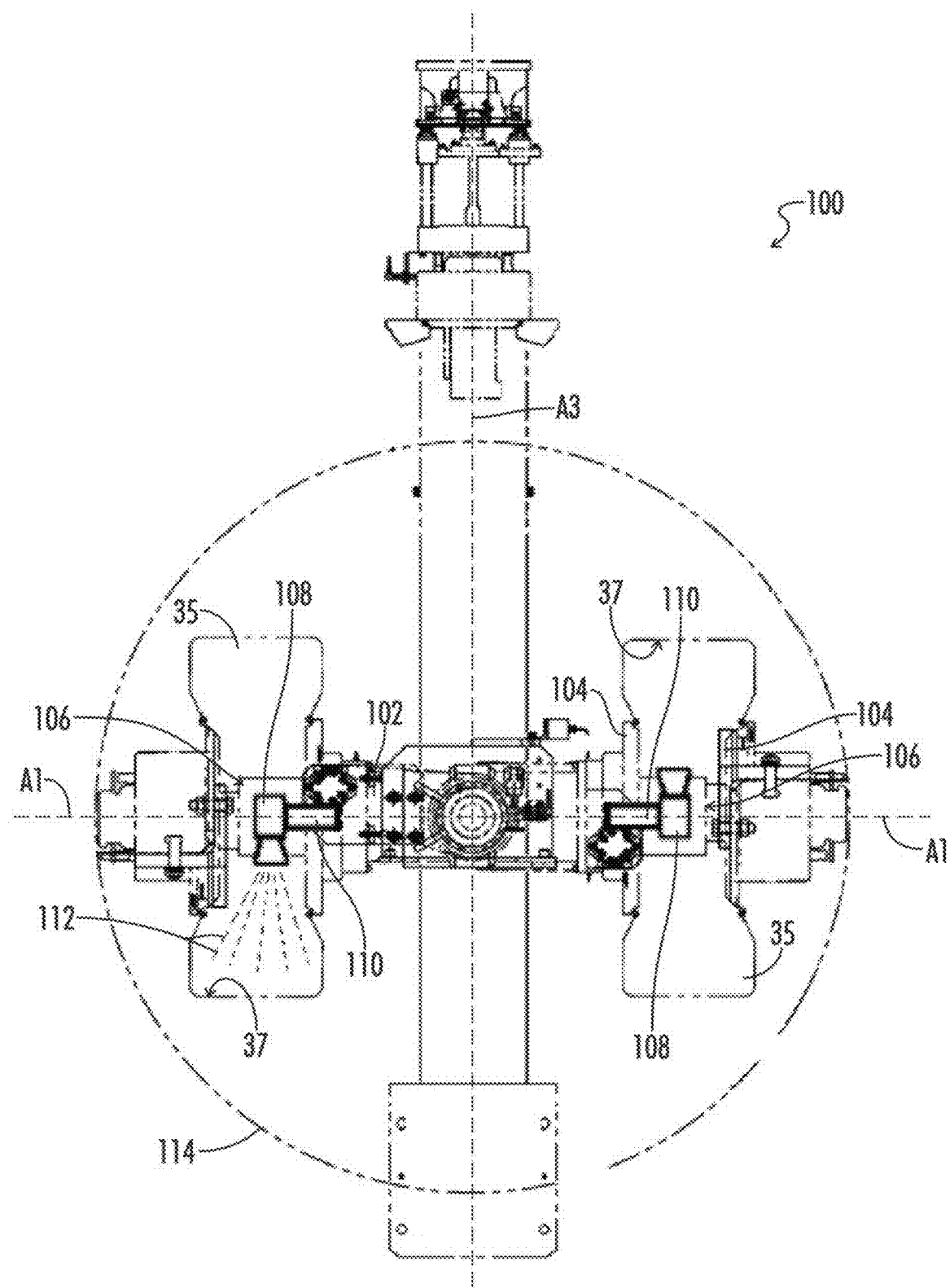
FIG. 6 is a side elevation view of the post-cure inflation machine of FIG. 3. This figure shows the post-cure inflation machine at a spraying step wherein the tire being sprayed is in the spray position.

Between some or all rotations, the tire holder shaft 102 may stop at a spray position that is substantially horizontal as shown in FIG. 6. The tire 35, then, is substantially vertical. The bottom tire 35 of FIG. 5, having completed its first post-cure inflation cycle, may rotate to this spray position on the left of FIG. 6. At this position, the tire 35 may receive a coating of air barrier material 112 sprayed from the spray nozzle 108. In many embodiments, the tire 35 may be rotated about the axis A1 of the tire holder shaft during and/or after the spraying process.

In some embodiments, the spray nozzle 108 may extend from inside the tire holder shaft 102 such that the spray nozzle is directed at the inner surface 37 of the tire 35. In these embodiments, the spray nozzle 108 may retract back inside the tire holder shaft 102 after completing the spraying task.

After the spraying step is finished, the tire 35 may then move to a second position, the top position of the two tires shown in FIG. 5, to undergo a second post-cure inflation cycle.

Additionally or alternatively, the tires 35 may receive a coating of air barrier material 112 sprayed from the spray nozzle 108 after the second post-cure inflation cycle. In some embodiments, the tire 35 may receive a coating of air barrier material 112 sprayed from the spray nozzle 108 during the second post-cure inflation cycle.

Dump Gate Assembly and Method Relating Thereto

Figure 7:
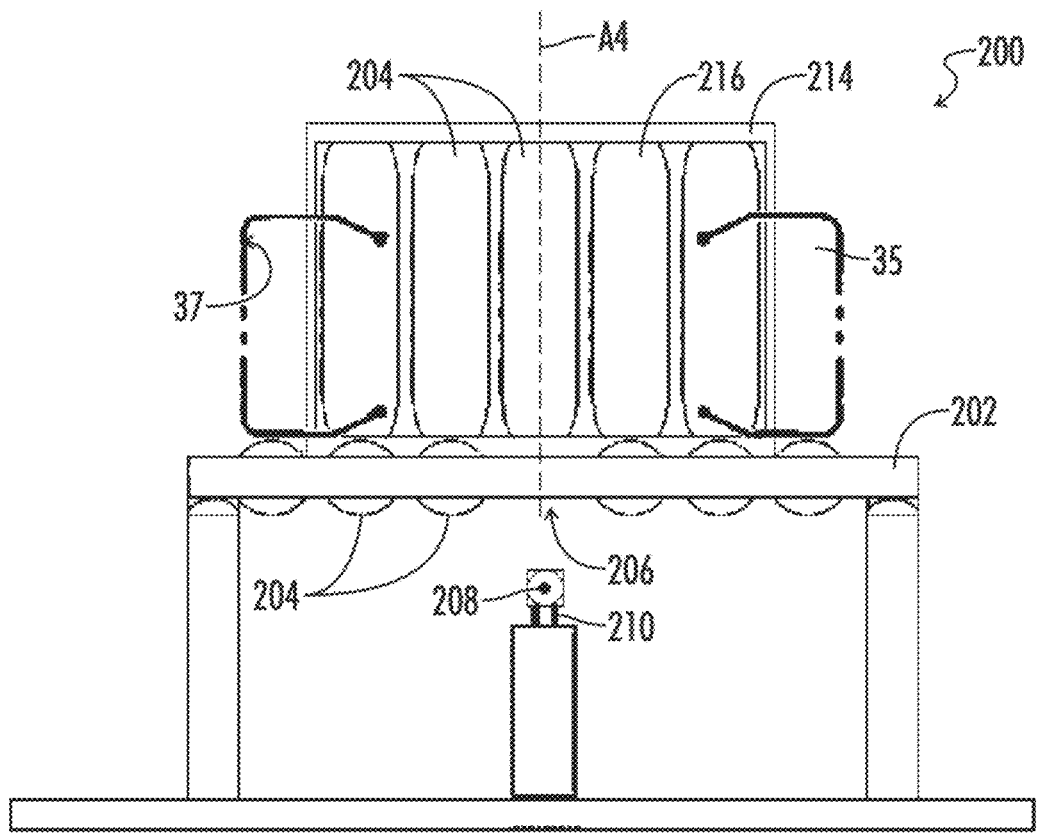
FIG. 7 is a front elevation view of an embodiment of a spray area section of a conveyor system, the spray area section including a dump gate.
Figure 8:
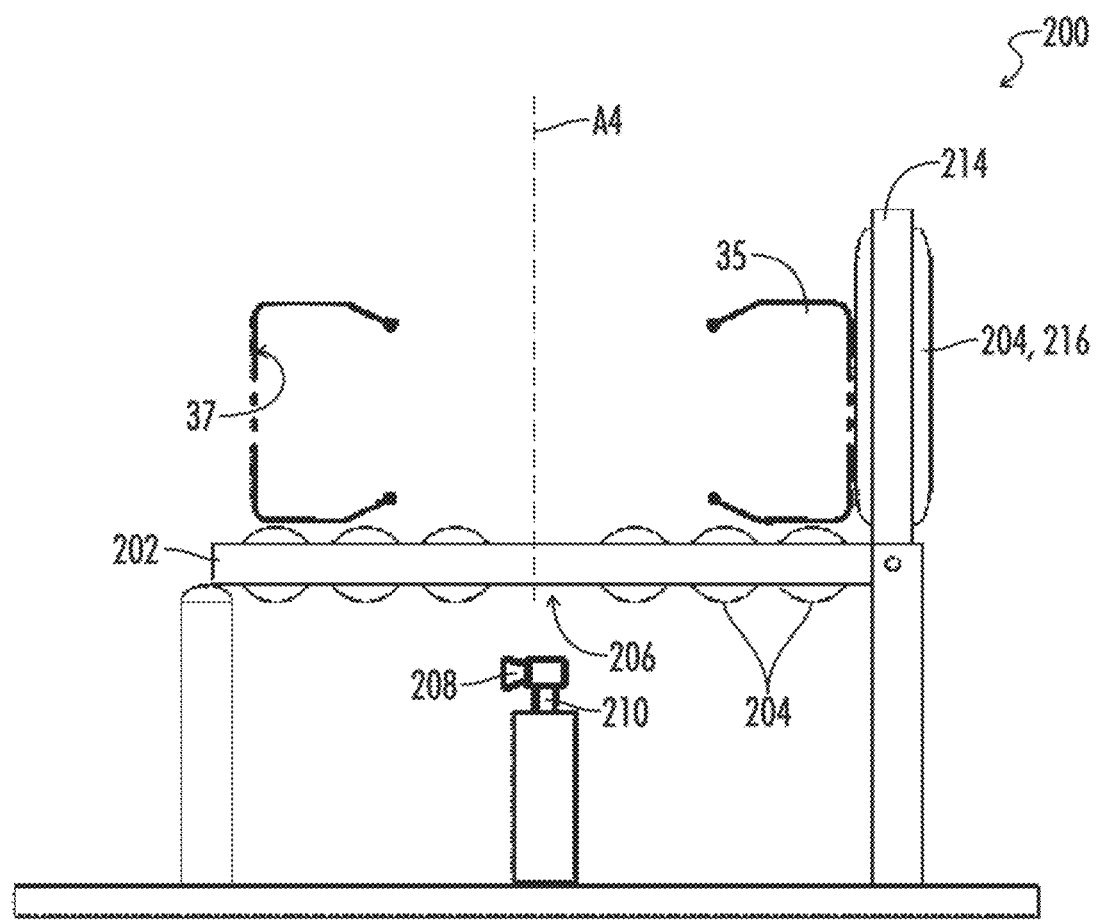
FIG. 8 is a side elevation view of the spray area section of FIG. 7 with the sprayer in the retracted position.
Figure 9:
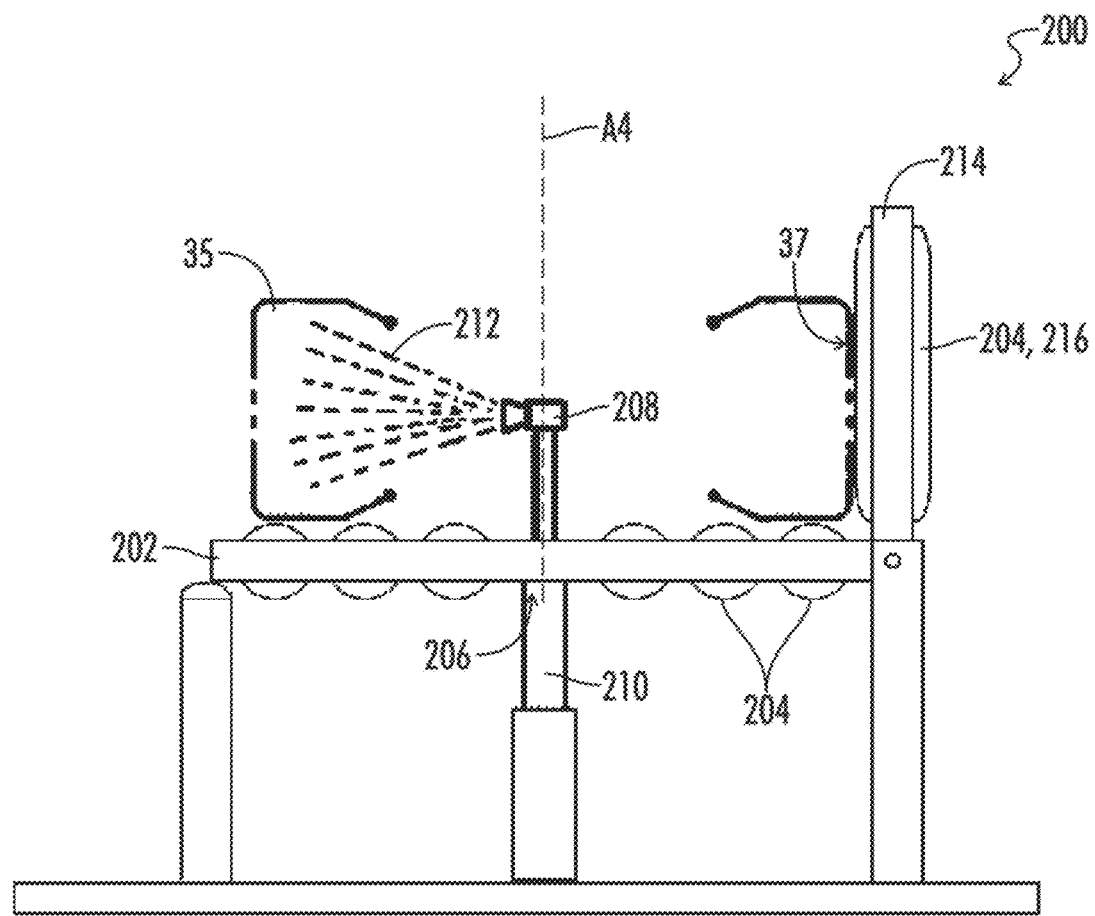
FIG. 9 is a side elevation view of the spray area section of FIG. 7 with the sprayer in the extended position.

In FIGS. 7-9, an embodiment of a spray area section 200 of a conveyor system is shown. With regard to FIGS. 7-9, the spray area section 200 is a dump gate assembly.

The dump gate assembly 200 may include a dump gate platform 202 for supporting the tire 35. In many embodiments, the dump gate platform 202 may include a plurality of rollers 204. The rollers 204 may be of any appropriate construction and may include bar rollers, ball bearing type rollers, conveyor belts, wheels, actuated sections of the spray area platform 202, and the like.

A spray passage 206 may be defined in the dump gate platform 202. This spray passage 206 may, in some embodiments, include a missing roller 204 or a gap between rollers, conveyor belts, and the like. A spray nozzle 208 may be configured to pass through the spray passage 206. The spray nozzle 208 may extend from below the dump gate platform 202 to above the dump gate platform by a telescopic spray shaft 210 in some embodiments. The spray nozzle 208 may extend to a position to spray an air barrier material 212 onto the tire 35.

A dump gate wall 214 may be positioned substantially orthogonally to the dump gate platform 202. The dump gate wall 214 may also include rollers 204 of any appropriate construction. At least one drive roller 216 may be disposed on the dump gate wall 214 to rotate the tire 35 about the tire axis A4 on the dump gate platform 202. The rest of the rollers 204 disposed on the dump gate wall 214 and the dump gate platform 202 may be configured to allow this rotation of the tire 35. Additionally or alternatively, the spray nozzle 208 may be configured to rotate on the spray shaft 210 during the spray operation.

A method of applying the air barrier material 212 to an inner surface 37 of the tire 35 may be performed with the above described spray area section 200. The method may include performing a post-cure inflation of the tire 35.

After the post-cure inflation process has been completed, the tire 35 may be placed on the dump gate platform 202. The tire 35 may be placed on the dump gate platform 202 by a robotic arm or a person.

While the tire 35 is on the dump gate platform 202, the air barrier material 212 is sprayed onto the inner surface 37 of the tire. This step may be accomplished by first extending the spray nozzle 208 from below the dump gate platform 202. In some embodiments, the spray shaft 210 is telescopically elongated to extend the spray nozzle 208. The spray nozzle 208 may then be directed at the inner surface 37 of the tire 35. After the spraying step is completed, the spray nozzle 208 may be retracted back to a position below the dump gate platform 202. In some embodiments, the spray shaft 210 telescopically retracts to retract the spray nozzle 208.

The tire 35 may then be removed from the dump gate assembly 200 by a robotic arm, a person, or (as discussed below) may be released from the dump gate assembly by rotating the dump gate wall 214 away from the dump gate platform 202 to allow the tire to fall and come to rest on a conveyor belt.

Another embodiment of a spray area section, or dump gate assembly, 300 of a conveyor system is shown in FIGS. 10-13.

Like components to those shown in FIGS. 7-9 with respect to the dump gate assembly 200 are repeated in FIGS. 10-13 with a reference numeral that begins with a three instead of a two. As such, some of the reference numerals shown in FIGS. 10-13 may not otherwise be mentioned herein.

The dump gate assembly 300 may not include an opening or passage in the dump gate platform 302. Instead, the dump gate assembly 300 may be configured to move from a first position (shown in FIGS. 10 and 13) with the dump gate platform 302 substantially horizontal to a second position (shown in FIG. 11) with the dump gate platform substantially vertical. With the dump gate platform 302 in the second position, the tire 35 is also positioned substantially vertically and rests on the dump gate wall 314.

The spray shaft 310 may be mounted to a sprayer tower 318 such that the spray nozzle 308 may extend substantially parallel with the ground toward the tire 35.

As discussed briefly above, the dump gate wall 314 may be configured to rotate in a direction D1 (up and into the page of FIG. 12) away from the dump gate platform 302 to allow the tire 35 to fall and come to rest on a conveyor belt 320. The conveyor belt 320 may be positioned to receive the tire 35 and to carry the tire away from the dump gate assembly 300 and toward another component of the tire manufacturing process.

A method of applying the air barrier material 312 to an inner surface 37 of the tire 35 may be performed with the above described spray area section 300. The method may include performing a post-cure inflation of the tire 35.

After the post-cure inflation process has been completed, the tire 35 may be placed on the dump gate platform 302. The tire 35 may be placed on the dump gate platform 302 by a robotic arm or a person.

Figure 10:
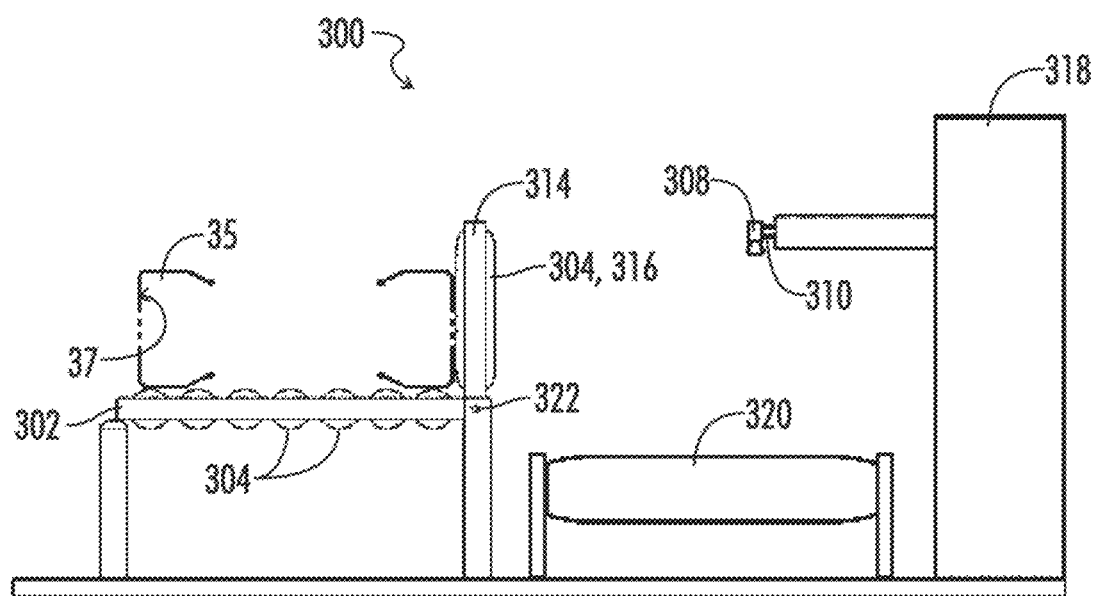
FIG. 10 is a side elevation view of an embodiment of a spray area section of a conveyor system showing a receiving conveyor and a horizontally mounted sprayer, the spray area section including a dump gate.
Figure 11:
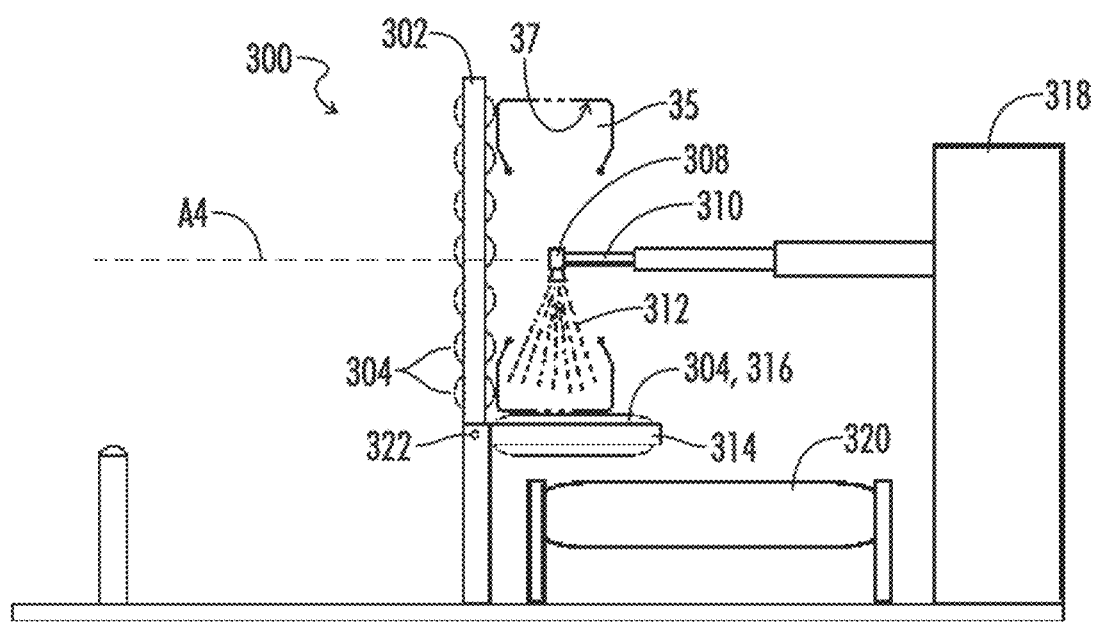
FIG. 11 is a side elevation view of the spray area section of FIG. 10 with the dump gate holding the tire in a vertical position while the sprayer applies the air barrier material.
Figure 12:
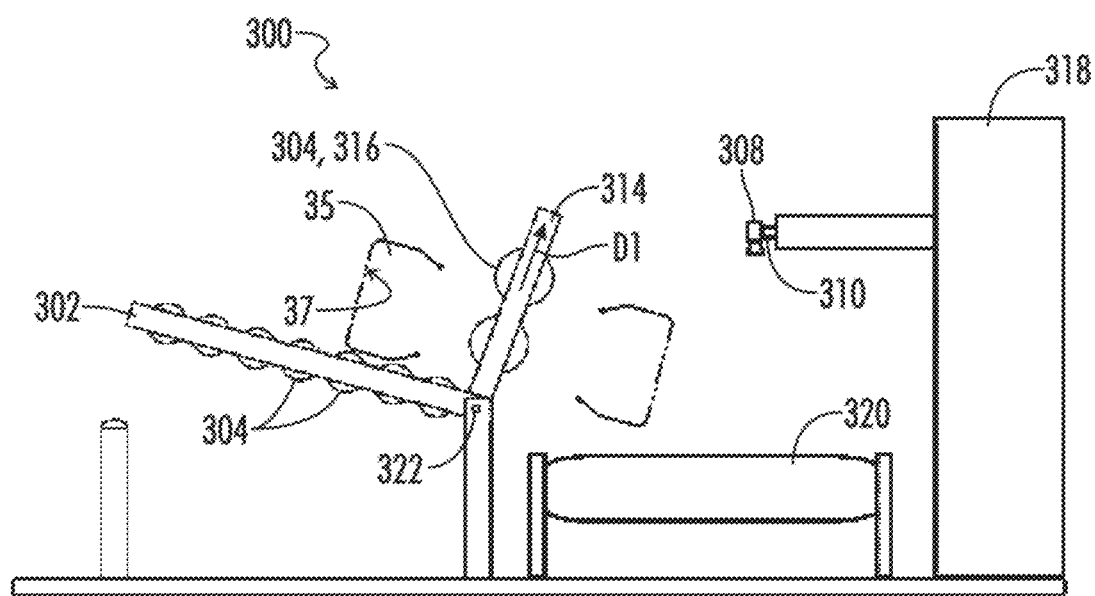
FIG. 12 is a side elevation view of the spray area section of FIG. 10 with the dump gate in a dump position to transfer the tire to the receiving conveyor after the tire has been sprayed with the air barrier material.
Figure 13:
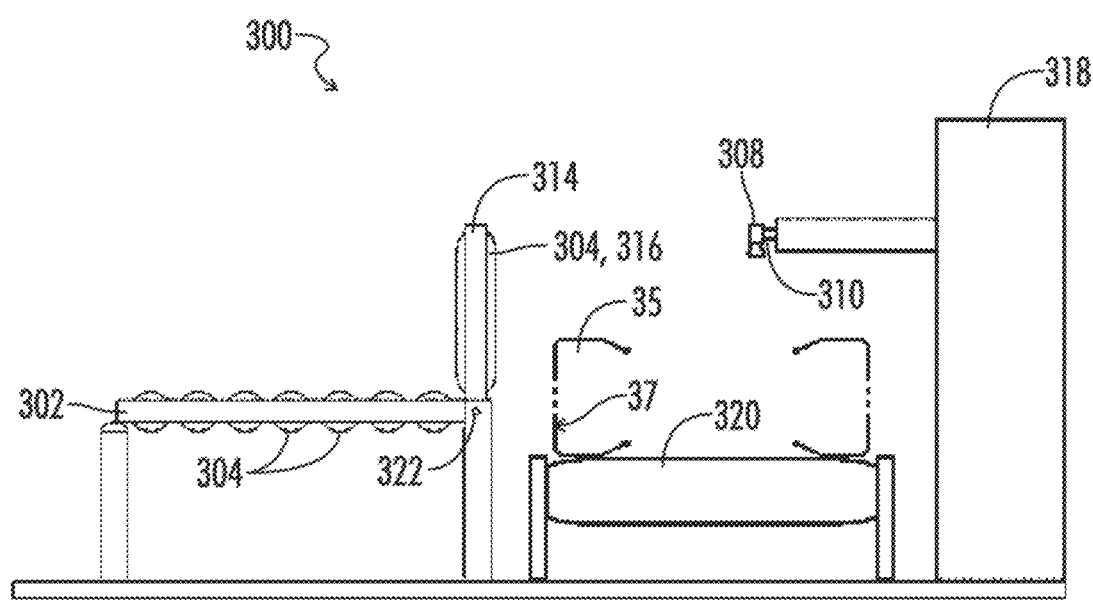
FIG. 13 is a side elevation view of the spray area section of FIG. 10 with the dump gate in the start position to receive a new tire after the previous tire has been transferred to the receiving conveyor.

The tire may come to rest on the dump gate platform 302 in a first position that is substantially horizontal, as shown in FIG. 10. Next, as shown in FIG. 11, the tire may be moved into a spray position that is substantially vertical. This step may be accomplished by rotating the dump gate assembly 300 about a pivot point 322. This rotation may be accomplished by a motor connected to a portion of the dump gate assembly 300, a human actuating the rotation, and the like. Once the tire is in the substantially vertical position, the spray nozzle 308 extends toward the tire 35 such that the spray nozzle may spray air barrier material 312 onto the inner surface 37 of the tire. A spraying step is performed while the tire 35 is rotated about its axis A4 by the at least one drive roller 316 on the dump gate wall 314. After the spraying step is completed, the spray nozzle 308 retracts toward the spray tower 318, and the dump gate assembly 300 is rotated back to the first position, as shown in FIG. 10. Additionally or alternatively, the dump gate assembly 300 may be rotated to the release position, as shown in FIG. 12. In the release position, the dump gate wall 314 may be rotated in a direction D1 (represented by an arrow indicating up and into the page of FIG. 12) such that it no longer obstructs the tire 35 in its path to the conveyor belt 320. After the tire has passed to the conveyor belt 320, the dump gate assembly 300 moves back to the first position to receive the next tire, as shown in FIG. 13.

Conveyor System Assembly and Method Relating Thereto

Figure 14:
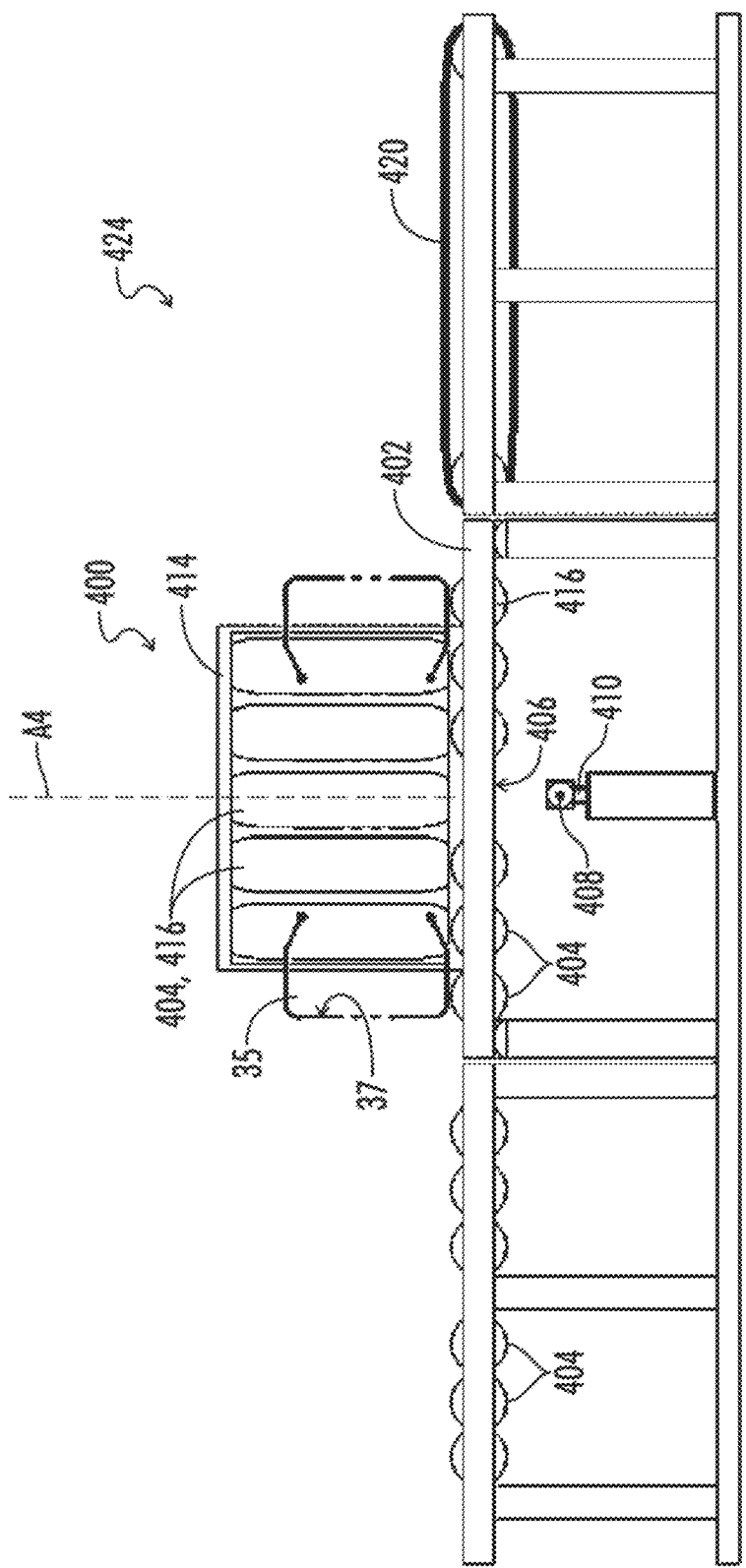
FIG. 14 is a front elevation view of an embodiment of a spray area section of a conveyor system showing a delivery conveyor and a receiving conveyor. The spray area section being similar to that shown in FIGS. 7-9, but with no dump gate.

Another embodiment of a spray area section 400 of a conveyor system 424 is shown in FIGS. 14.

Like components to those shown in FIGS. 7-9 with respect to the dump gate assembly 200 are repeated in FIG. 14 with a reference numeral that begins with a four instead of a two with regard to the spray area section 400. As such, some of the reference numerals shown in FIG. 14 may not otherwise be mentioned herein.

The spray area section 400 may function largely in the same way as the dump gate assembly 200, except the spray area section may not include the release function as discussed above with regard to the dump gate assemblies 200, 300. Instead, the spray area section 400 may be configured to receive the tire 35 from an upstream portion of the conveyor system 424. They spray area section 400 may also be configured to deliver the tire 35 to a downstream portion of the conveyor system 424. The portions of the conveyor system 424 other than the spray area section 400 may include a conveyor belt 420, rollers 404, wheels, actuated portions of a platform, a shaker table, and the like.

A method of applying the air barrier material 412 to an inner surface 37 of the tire 35 may be performed with the spray area section 400. This method may include conveying the tire to the spray area section 400 of a conveyor system 424. After the tire 35 has reached the spray area section 400, the tire is stopped. This stopping function may be performed by an unactuated drive roller 416 in the spray area platform 402 or by a drive roller briefly rolling in a direction opposite the direction of the tire's momentum. While the tire 35 is stopped on the spray area section 400, the spray nozzle 408 extends from below the spray area platform 402 to above the spray area platform. The spray nozzle 408 sprays air barrier material (not shown) onto the inner surface 37 of the tire. After the spraying step is completed, the spray nozzle 408 retracts back to below the spray area platform 402. The tire is then conveyed away from the spray area section 400. This conveyance may be initiated by a drive roller 416 in the spray area platform 402, and the tire 35 may be further carried away by downstream rollers 404 (or a conveyor belt, wheels, actuated portions of a platform, shaker tables, and the like).

In some embodiments, one or more drive rollers 416 in the spray area wall 414 may rotate the tire about its axis A4 during the spray operation. Additionally or alternatively, the spray nozzle 408 may rotate about the spray shaft 410 during the spray operation.

Figure 15:
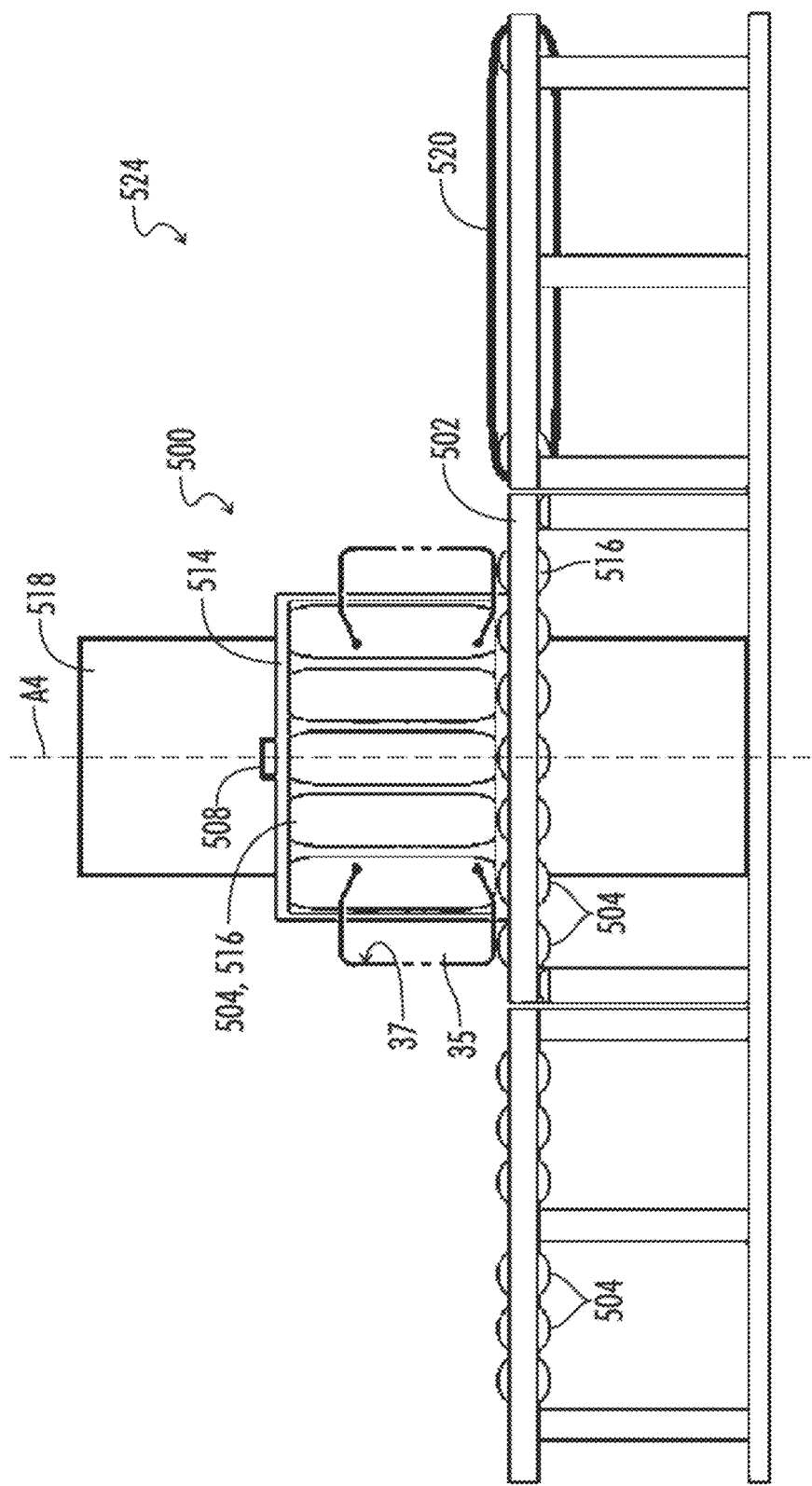
FIG. 15 is a front elevation view of an embodiment of a spray area section of a conveyor system showing a delivery conveyor and a receiving conveyor.
Figure 16:
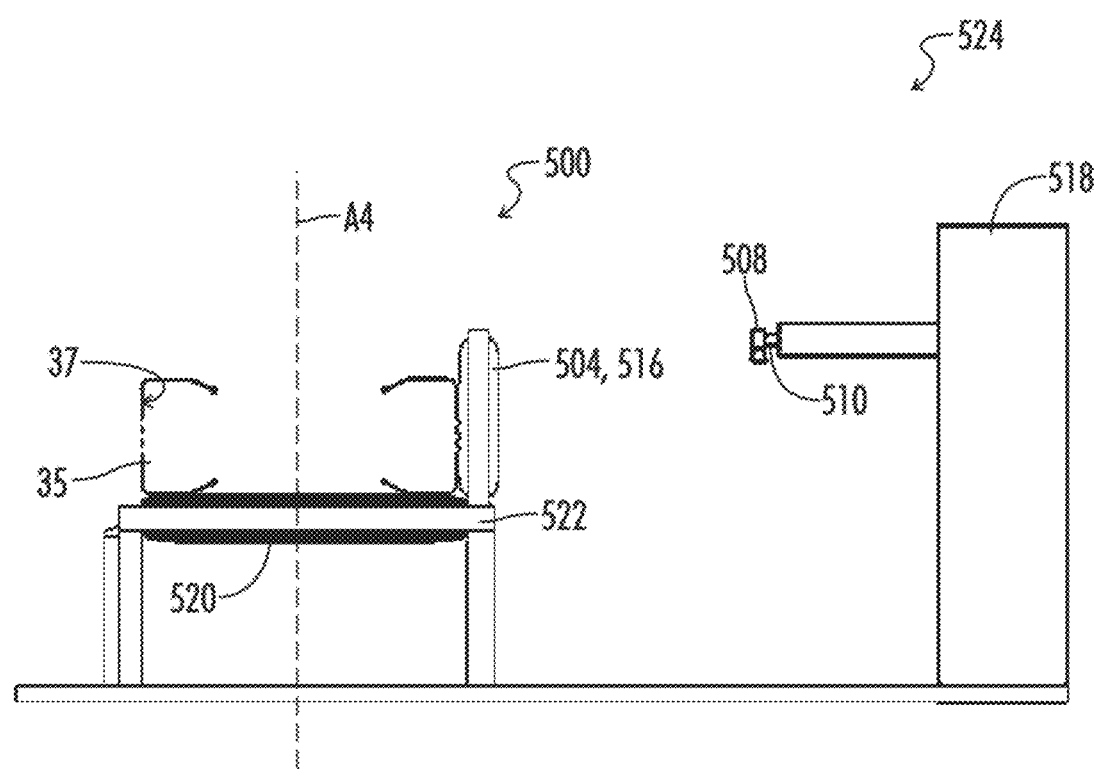
FIG. 16 is a side elevation view of the spray area section of FIG. 15. The spray area section being similar to that shown in FIGS. 10 and 11, but with no dump gate and with a differently located receiving conveyor.

Another embodiment of a spray area section 500 of a conveyor system 524 is shown in FIGS. 15 and 16.

Like components to those shown in FIGS. 10-13 with respect to the dump gate assembly 300 are repeated in FIGS. 15 and 16 with a reference numeral that begins with a five instead of a three. As such, some of the reference numerals shown in FIGS. 15 and 16 may not otherwise be mentioned herein.

The spray area section 500 may function largely in the same way as the dump gate assembly 300, except the spray area section may not include the release function as discussed above with regard to the dump gate assemblies 200, 300. Instead, the spray area section 500 may be configured to receive the tire 35 from an upstream portion of the conveyor system 524 and to deliver the tire to a downstream portion of the conveyor system (like conveyor system 424 of FIG. 14 discussed above).

A method of applying the air barrier material 512 to an inner surface 37 of the tire 35 may be performed with the spray area section 500. This method may include conveying the tire to the spray area section 500 of a conveyor system 524. After the tire 35 has reached the spray area section 500, the tire is stopped in a manner similar to the spray area section 400. The tire is stopped on the spray area platform 502 in a substantially horizontal position (shown in FIGS. 15 and 16). While the tire is stopped on the spray area platform 502, the tire is moved to a spray position that is substantially vertical (similar to the dump gate assembly 300 shown in FIG. 11) by rotating the spray area section 500 about the pivot point 522. In the spray position, the tire 35 may be supported by the rollers 504 including at least one drive roller 516 of the spray area wall 514. Also similar to the discussion above with regard to the dump gate assembly 300, the tire 35 may be rotated about its axis A4 by actuating the at least one drive roller 516. While the tire 35 is rotating, the air barrier material is sprayed from the spray nozzle 508 to coat the inner surface 37 of the tire. When the spraying step is completed, the tire 35 returns to the substantially horizontal position by rotating the spray area section 500 about the pivot point 522 once more. Once the tire 35 has returned to the substantially horizontal position, as shown in FIGS. 15 and 16, the tire is then conveyed away from the spray area section 500. As with the spray area section 400 discussed above, a drive roller 516 in the spray area platform 502 may move the tire 35 to downstream rollers 504 and the like.

Tire Trimming Machine and Method Relating Thereto

Figure 17:
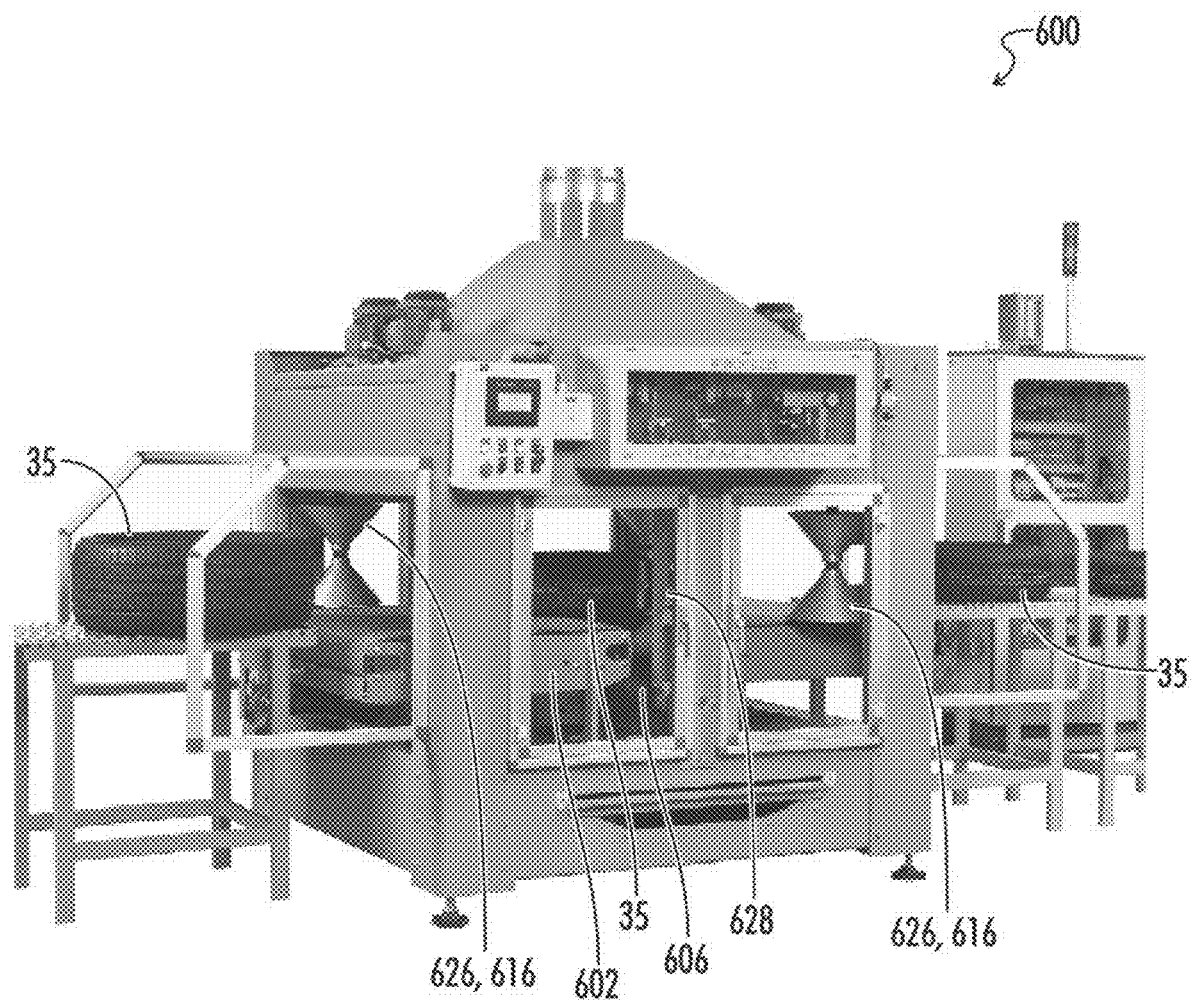
FIG. 17 is a perspective view of an embodiment of a tire trimming machine.
Figure 18:
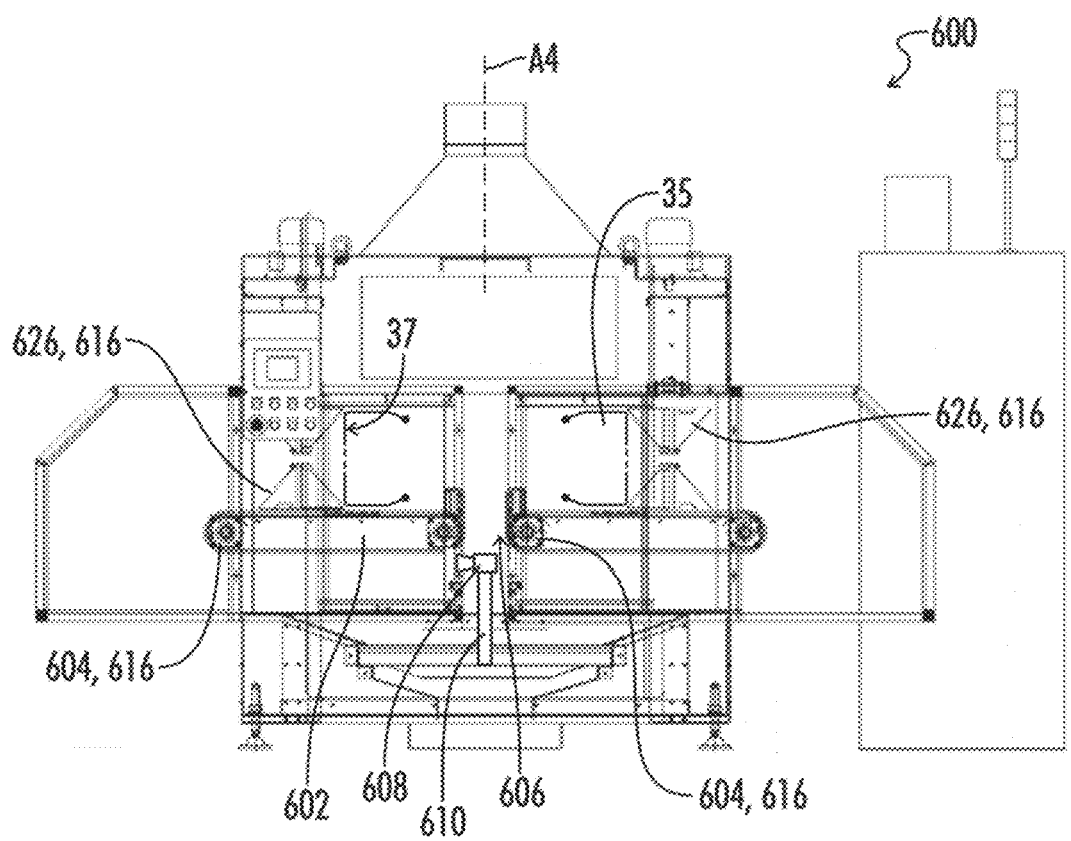
FIG. 18 is a cross-sectional view of the tire trimming machine of FIG. 17 including a sprayer in a retracted position.
Figure 19:
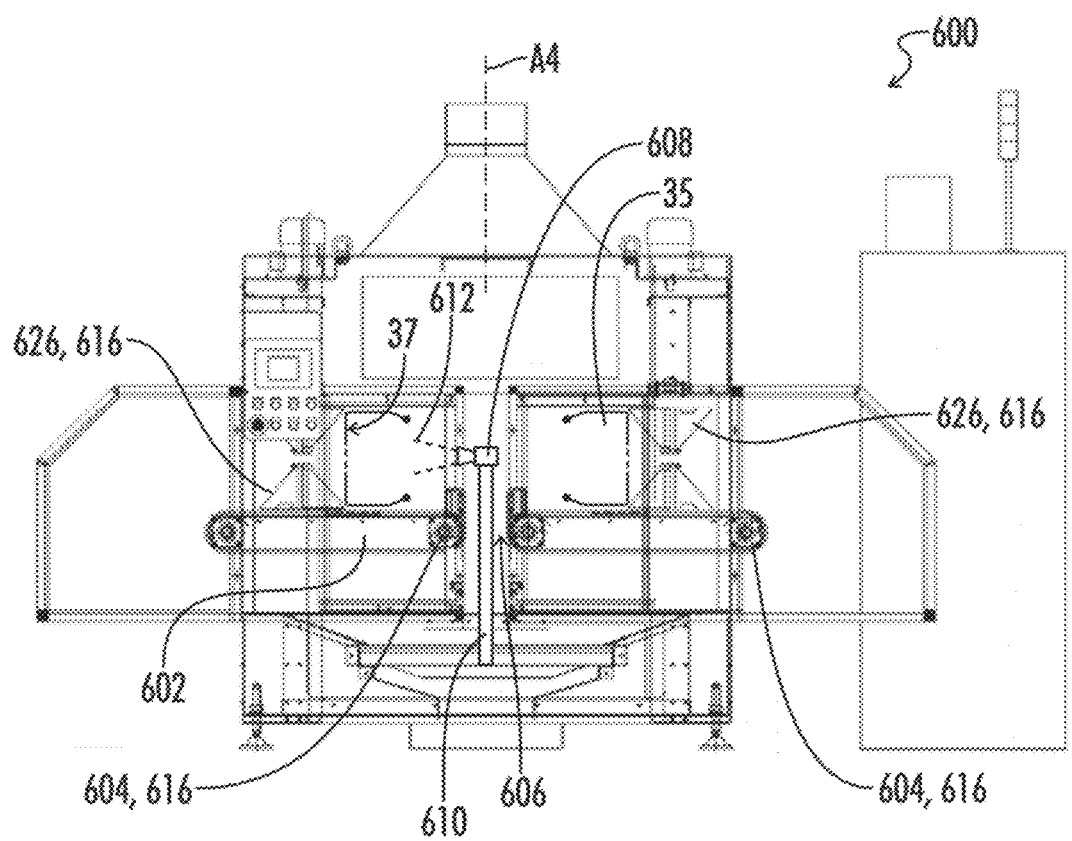
FIG. 19 is a cross-sectional view of the tire trimming machine of FIG. 17 with the sprayer in an extended position and spraying an air barrier material onto a tire.

In FIGS. 17-19, an embodiment of a tire trimming machine 600 is shown. The tire trimming machine 600 may include at least one tire receiving platform 602. The tire support platform may include rollers 604 in the form of conveyor belts, wheels, bearings, and the like. The rollers 604 may also be driven rollers 616 to move the tire 35 into the correct position. The tire receiving platform 602 may include a sprayer passage 606 to allow a spray nozzle 608 to extend from below the tire support platform to above the tire support platform. The spray nozzle 608 may be extended by a telescoping spray shaft 610 such that the spray nozzle may direct air barrier material 612 at the inner surface 37 of the tire 35.

The tire trimming machine 600 may further include at least one centering roller 626. The centering roller 626 may be configured to bias the tire 35 into a centered position (as shown in FIGS. 18 and 19). In some embodiments, the centering roller 626 may include one or more conical rollers. The centering rollers may also include drive rollers 616 such that the tire is rotated about its axis A4.

At least one blade 628 may be configured to trim the tire 35 as it spins about its axis A4.

Although the tire trimming machine 600 is shown configured to maintain the tire 35 in a substantially horizontal position, it is contemplated that another embodiment of a tire trimming machine may maintain the tire in a substantially vertical position. It is even contemplated that an embodiment of a tire trimming machine may receive the tire 35 in a substantially horizontal position, move the tire to a substantially vertical position for the spraying operation, and return the tire to the substantially horizontal position before conveying the tire away from the tire trimming machine. In such embodiments, the at least one centering roller 626 may be further configured to hold the tire 35 in a first position that is substantially vertical.

A method of applying the air barrier material 612 to an inner surface 37 of the tire 35 may be performed with the tire trimming machine 600. This method may include placing the tire 35 in the tire trimming machine 600. Once the tire 35 is in place, centering the tire in the tire trimming machine 600 with at least one centering roller 626. After the tire 35 has been centered, rotating the tire in the tire trimming machine with at least one drive roller 616 as part of a tire trimming operation. Either prior to starting to rotate the tire 35 about its axis A4 or while the tire is rotating, extending the spray nozzle 608 from below the tire receiving platform 602 to above the tire receiving platform such that the spray nozzle is directed at the inner surface 37 of the tire. While trimming the tire 35 with the at least one blade 628, spraying the air barrier material 612 onto the inner surface 37 of the tire. After the spraying operation is completed, retracting the spray nozzle 608 back to below the tire receiving platform 602.

Spray Booth and Method Relating Thereto

Figure 20:
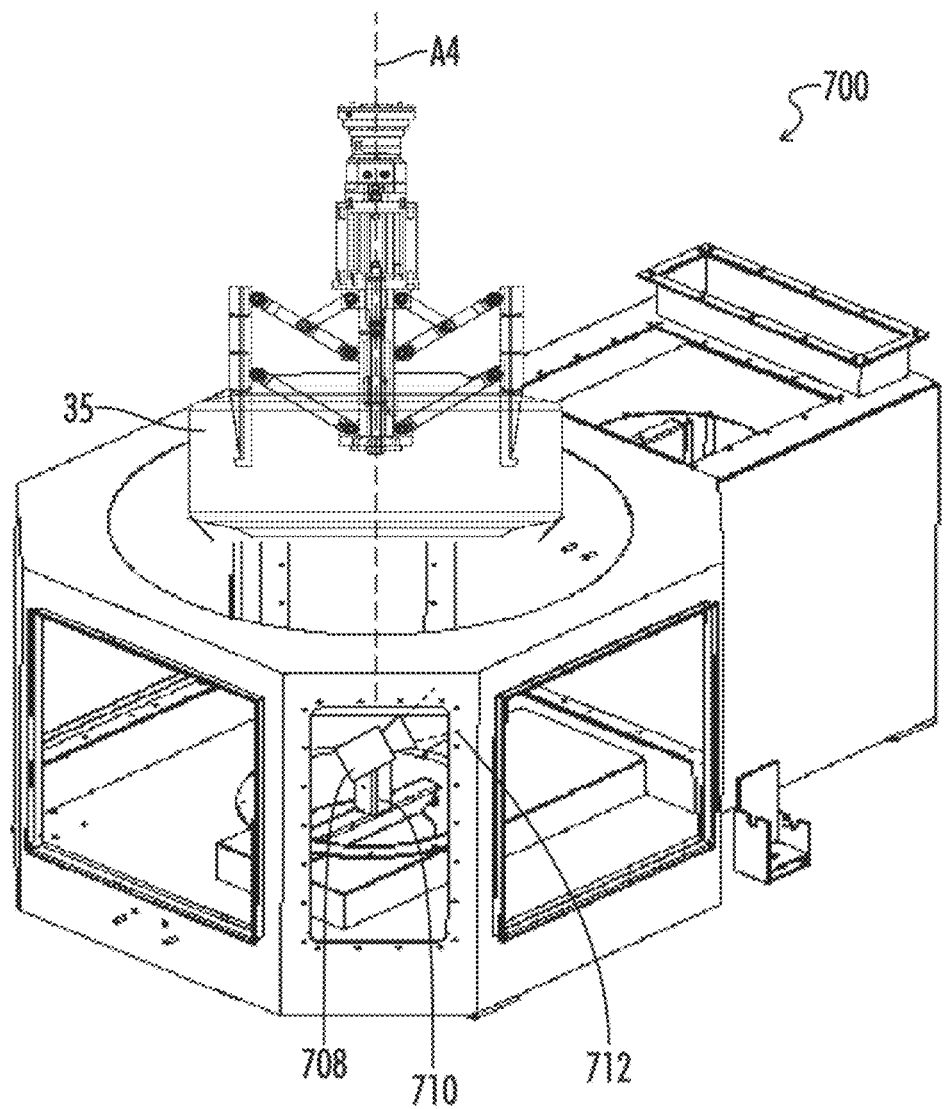
FIG. 20 is a perspective view of a spray booth for spraying an air barrier material onto a tire.

In FIG. 20, an embodiment of a spray booth 700 is shown. The spray booth 700 may be a designated location for spraying the air barrier material 712 onto the tire 35 to prevent overspray. The spray nozzle 708 may be mounted to a portion of the spray booth 700 by the spray shaft 710. In some embodiments, the spray shaft 710 may be telescopic such that the spray shaft may extend and retract to position the spray nozzle 708 correctly depending on the size of the tire 35 placed in the spray booth. The spray booth 700 may be a part of the assembly line of the tire 35, or it may be separate from such an assembly line. A robotic arm or a human may place the tire 35 in the spray booth and may similarly remove the tire from the spray booth after the spraying operation has completed. The spray booth 700 may be a partial or complete enclosure, depending on the embodiment. The tire 35 may rotate about its axis A4, or the spray nozzle 708 may rotate about the spray shaft 710, or both during the spraying operation.

Although the spray booth 700 is shown configured to maintain the tire 35 in a substantially horizontal position, it is contemplated that another embodiment of a spray booth may maintain the tire in a substantially vertical position. It is even contemplated that an embodiment of a spray booth may receive the tire 35 in a substantially horizontal position, move the tire to a substantially vertical position for the spraying operation, and return the tire to the substantially horizontal position before conveying the tire away from the spray booth.

Sprayer Apparatus and Method Related Thereto

Figure 21:
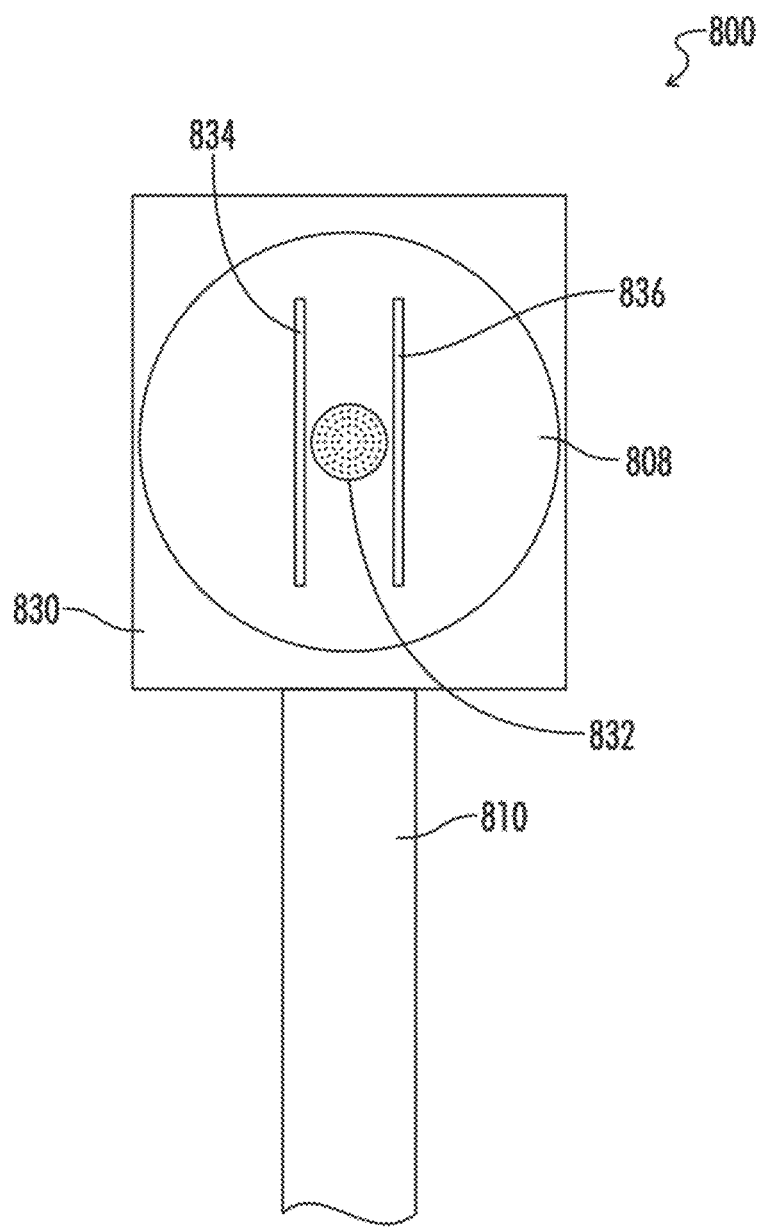
FIG. 21 is a front elevation view of a spray apparatus for spraying an air barrier material onto an inner surface of a tire.
Figure 22:
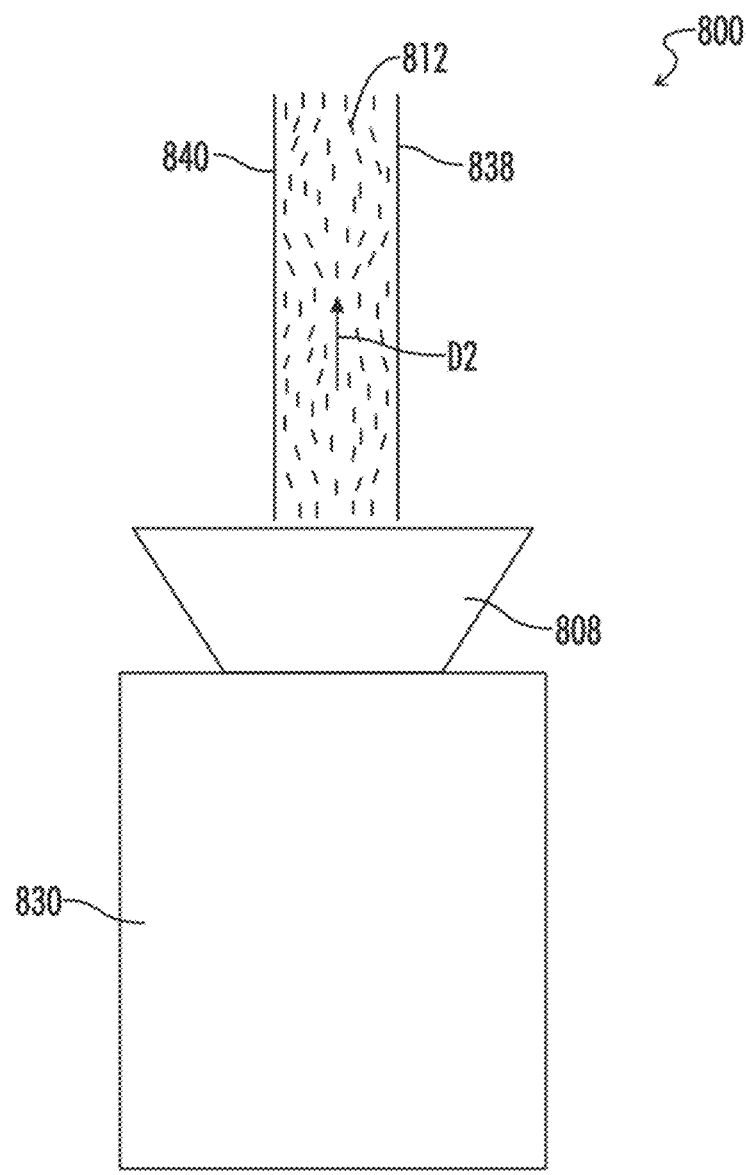
FIG. 22 is a top plan view of the spray apparatus of FIG. 21 while spraying the air barrier material.
Figure 23:
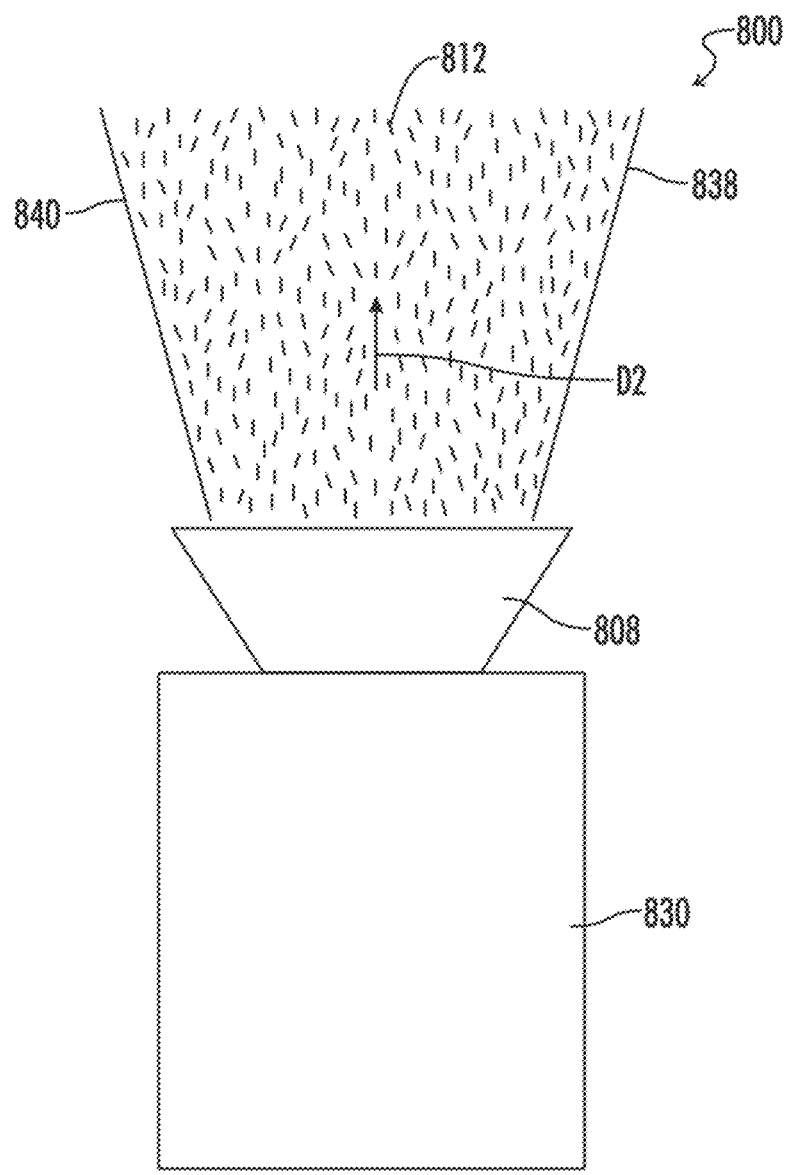
FIG. 23 is a top plan view of another configuration of the spray apparatus of FIG. 21 while spraying the air barrier material.
Figure 24:
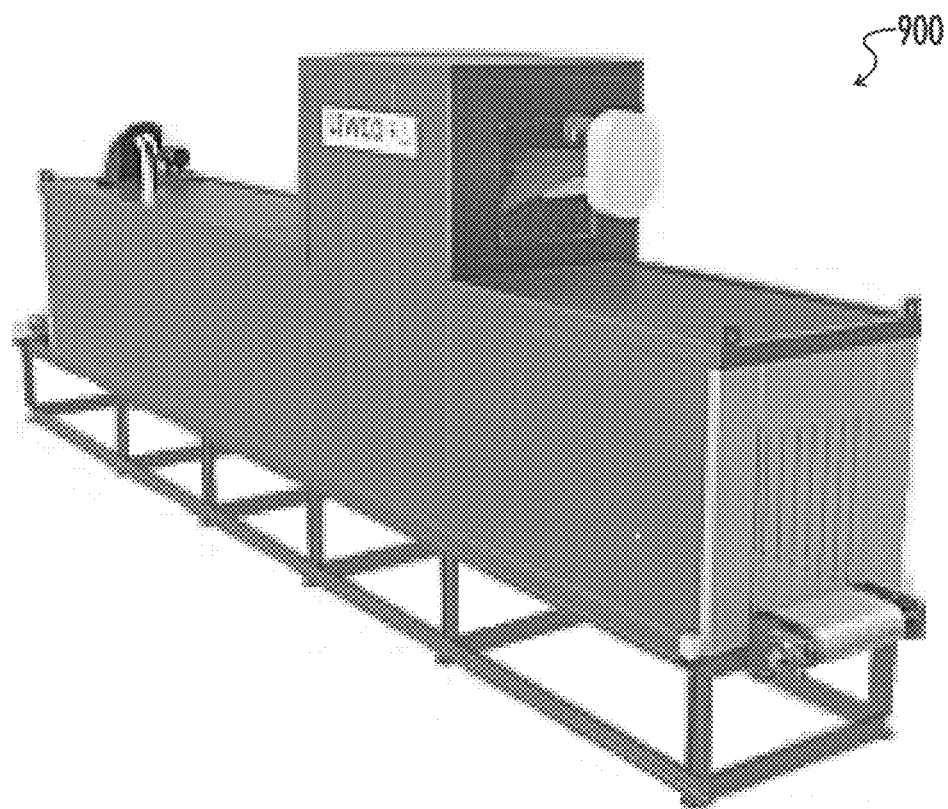
FIG. 24 is a perspective view of a conveyor oven.

As shown in FIGS. 21-23, any of the spray nozzles 108, 208, 308, 408, 508, 608, and 708 and spray shafts 110, 210, 310, 410, 510, 610, and 710 discussed herein may be of a particular construction in some embodiments.

A sprayer apparatus 800 for spraying an air barrier material 812 may include a spray nozzle 808 and a spray shaft 810. The spray nozzle 808 may be part of a spray head 830.

The spray nozzle 808 may include at least one material opening 832 defined in the nozzle. The at least one material opening 832 may be configured to project the air barrier material 812 in a general material direction D2.

At least one first air projection opening 834 may be defined in the spray nozzle 808 on a first side of the at least one material opening 832. At least one second air projection opening 836 may be defined in the spray nozzle 808 on a second side of the at least one material opening 832. The second side may be opposite the first side. The at least one first air projection opening 834 may be configured to project a first air blade 838. The at least one second air projection opening 836 may be configured to project a second air blade 840. The at least two air blades 838, 840 may be configured to contain the air barrier material 812 therebetween.

As shown in FIG. 22, the air blades 838, 840 may be directed substantially parallel to the general material direction D2 such that the air barrier material 812 projects substantially completely parallel to the general material direction. As shown in FIG. 23, however, the spray nozzle 808 may alternatively be configured such that the air blades 838, 840 form angles with respect to the general material direction D2. In this configuration, the air barrier material 812 may project in a more fanned out pattern along the general material direction D2. In further still configurations, the spray nozzle 808 may include air blades 838, 840 (and perhaps additional air blades) positioned and aimed such that FIG. 22 represents a side view of the spray pattern and FIG. 23 represents a top view of the spray pattern.

More than two air blades 838, 840 are contemplated herein. Less than two air blades 838, 840 is also contemplated. In some embodiments, the air blades may be of a proper number to form any polygonal shape about the at least one material opening 832. In one embodiment, the air blade may be formed by a single opening forming a circle about the at least one material opening 832. No matter the number of air blades, the air projection opening(s) are configured to form a virtual spray enclosure for the air barrier material 812.

Air Barrier Material Curing Oven

The current disclosure contemplates a need for baking the tire 35 having the inner surface 37 coated with an air barrier material in order to cure the air barrier material. As such, a conveyor type curing oven 900 is shown in FIG. 23. This conveyor type curing oven 900 would allow the tires 35 to continue moving along an assembly line. It is also contemplated, however, that the tires 35 could be removed from the assembly line, placed in a large oven (for instance, a walk-in, heated room), cured for a period of time, removed, and returned to the assembly line.

It is also contemplated that embodiments of the air barrier material currently developed or hereinafter developed may not require curing with an oven of any sort. In embodiments with self-curing air barrier material, no oven would be required.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A method of applying an air barrier material to an inner surface of a tire, the method comprising:
    placing the tire in a substantially horizontal position on a receiving platform of a tire trimming machine;
    centering the tire on the receiving platform with at least one centering roller;
    extending a spray nozzle from below the tire receiving platform to above the tire receiving platform such that the spray nozzle is directed at an inner surface of the tire;
    rotating the tire in the substantially horizontal position;
    trimming the tire while rotating the tire in the substantially horizontal position; and
    during the trimming, spraying the air barrier material with the spray nozzle onto the inner surface of the tire.

2. The method of claim 1, wherein:
    the extending is performed prior to the rotating.

3. The method of claim 1, wherein:
    the extending is performed during the rotating.

4. The method of claim 1, further comprising:
    after the spraying is completed, retracting the spray nozzle back below the tire receiving platform.

5. The method of claim 1, wherein:
    the extending includes extending the spray nozzle along a rotational axis of the tire into a central opening of the tire.

6. The method of claim 1, wherein:
    the trimming includes trimming the tire with at least one blade.

7. A method of applying an air barrier material to an inner surface of a tire, the method comprising:
    placing the tire in a substantially horizontal position on a receiving platform of a tire trimming machine;
    moving the tire from the substantially horizontal position to a substantially vertical position;
    extending a spray nozzle such that the spray nozzle is directed at an inner surface of the tire;
    rotating the tire in the substantially vertical position;
    spraying the air barrier material with the spray nozzle onto the inner surface of the tire while rotating the tire in the substantially vertical position;
    returning the tire to the substantially horizontal position;
    trimming the tire; and
    conveying the tire away from the tire trimming machine.

8. The method of claim 7, wherein:
the spraying occurs during the trimming.
9. The method of claim 7, wherein:
the extending is performed prior to the rotating.
10. The method of claim 7, wherein:
the extending is performed during the rotating.
11. The method of claim 7, further comprising:
after the spraying is completed, retracting the spray nozzle.
12. The method of claim 7, wherein:
the extending includes extending the spray nozzle along a rotational axis of the tire into a central opening of the tire.

* * * * *